US008848255B2

(12) United States Patent
Sakatani

(10) Patent No.: US 8,848,255 B2
(45) Date of Patent: Sep. 30, 2014

(54) IMAGE FORMING APPARATUS, IMAGE FORMING SYSTEM AND UPDATING METHOD OF MULTI-DIMENSIONAL LUT

(71) Applicant: Konica Minolta, Inc., Tokyo (JP)

(72) Inventor: Kazuomi Sakatani, Sagamihara (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/785,712

(22) Filed: Mar. 5, 2013

(65) Prior Publication Data

US 2013/0235430 A1    Sep. 12, 2013

(30) Foreign Application Priority Data

Mar. 6, 2012    (JP) .................................. 2012-048738

(51) Int. Cl.
| | | |
|---|---|---|
| H04N 1/60 | (2006.01) | |
| H04N 1/40 | (2006.01) | |
| G03F 3/08 | (2006.01) | |
| G06K 15/12 | (2006.01) | |
| G06K 15/02 | (2006.01) | |
| B41J 29/393 | (2006.01) | |
| G06F 3/12 | (2006.01) | |

(52) U.S. Cl.
CPC .............. *G06K 15/1878* (2013.01); *H04N 1/60* (2013.01); *G06K 15/129* (2013.01); *B41J 29/393* (2013.01); *G06F 3/122* (2013.01); *G06F 3/1229* (2013.01)
USPC ........... 358/3.23; 358/1.9; 358/3.01; 358/518

(58) Field of Classification Search
CPC ......... H04N 1/54; H04N 1/60; H04N 1/6019; H04N 1/6033; G06K 15/1848; G06K 15/1878; G06K 15/129
See application file for complete search history.

(56) References Cited

U.S. PATENT DOCUMENTS

| | | | | |
|---|---|---|---|---|
| 2010/0157337 | A1* | 6/2010 | Akado et al. .................... | 358/1.9 |
| 2010/0321747 | A1 | 12/2010 | Sakamoto et al. | |
| 2012/0050771 | A1* | 3/2012 | Sakatani ......................... | 358/1.9 |
| 2012/0206743 | A1* | 8/2012 | Murakami ....................... | 358/1.9 |

FOREIGN PATENT DOCUMENTS

| | | |
|---|---|---|
| JP | 2005-165464 | 6/2005 |
| JP | 2007-137013 | 6/2007 |
| JP | 2010-217673 | 9/2010 |
| JP | 2011-004167 A | 1/2011 |

OTHER PUBLICATIONS

Office Action in corresponding Japanese Patent Application No. 2012-048738 dated May 1, 2014, with translation (16 pages).

\* cited by examiner

*Primary Examiner* — Benny Q Tieu
*Assistant Examiner* — Haris Sabah
(74) *Attorney, Agent, or Firm* — Osha Liang LLP

(57) ABSTRACT

An image forming apparatus including an image forming unit; a color conversion unit; a storage unit which stores a mixed-color pattern including a gradation of tones of a mixed color and a reference value of each of the tones; and a control unit which forms an image of the mixed-color pattern on the sheet with the image forming unit, compares color values representing color shades for each of the tones between an observed value of the image of the mixed-color pattern formed on the sheet and the reference value of the mixed-color pattern stored in the storage unit, and determines that the multi-dimensional LUT needs to be updated and updates the multi-dimensional LUT if a difference of the color values is determined to be large on the basis of a threshold value.

20 Claims, 14 Drawing Sheets

IMAGE FORMING APPARATUS, IMAGE FORMING SYSTEM AND UPDATING METHOD OF MULTI-DIMENSIONAL LUT

BACKGROUND OF THE INVENTION

1. Field of the Invention

The present invention relates to an image forming apparatus, an image forming system, and an updating method of a multi-dimensional LUT.

2. Description of Related Art

In an image forming apparatus, optimal reproduction of colors is achieved through procedures such as primary color calibration, multi-color calibration, and update of a multi-dimensional LUT called a color profile.

Primary color calibration is a process of updating γ correction curves for cyan (C), magenta (M), yellow (Y), and black (K) colors which are used in image formation, and achieves stable color reproducibility regardless of variable printing characteristics of the image forming apparatus. Multi-color calibration is a process of updating γ correction curves for mixed colors that are mixtures of at least two of the C, M, Y, and K colors. The γ correction curves for primary colors and multi-colors are stored in a one-dimensional LUT.

A multi-dimensional LUT which is used for color conversion receives, for example, four-dimensional CMYK values and, in response, outputs four-dimensional CMYK values corresponding to the printing characteristics of the image forming apparatus.

A new one-dimensional LUT and a new multi-dimensional LUT can be prepared by forming single-color or mixed-color patches of different tones and performing colorimetry on the patches.

The update of the multi-dimensional LUT achieves the highest color reproducibility. However, the update of a multi-dimensional LUT requires colorimetry on patches of at least one thousand mixed-colors with a prolonged operation time, whereas in the primary-color or multi-color calibration, colorimetry is performed on a small number of patches and calibration can be readily performed. It is preferable to update a multi-dimensional LUT at a minimum frequency because the productivity of the image forming apparatus decreases during the updating process.

A multi-dimensional LUT must be updated if the reproducibility of mixed colors varies greatly to an extent that color shades cannot be reproduced even though the targeted color reproducibility has been achieved for the primary colors (single colors). A variation in the color reproducibility that requires the update of the multi-dimensional LUT is often visually determined by a user observing a printed material or multi-color patches prepared during primary-color or multi-color calibration.

Such visual determination, however, is a difficult and complicated process. Moreover, the update of the multi-dimensional LUT based on such visual determination, which is a subjective process, may not be appropriate.

As a prerequisite, the color reproducibility must be the same for the primary colors. Thus, the multi-dimensional LUT may be automatically updated in cooperation with the primary-color calibration (refer to Japanese Patent Application Laid-Open No. 2010-217673 and No. 2005-165464).

A variation in the color reproducibility for the primary colors, however, does not necessarily lead to a variation in the multi-dimensional LUT. Thus, the update of the multi-dimensional LUT is not required in such a case.

According to the above former Patent document, the primary calibration is determined on the basis of single-color patches, but necessity of updating the multi-dimensional LUT is not determined. Similarly, according to the latter patent document, the adequacy of the data read from the patches to be used for the update of the multi-dimensional LUT is confirmed, but necessity of updating the multi-dimensional LUT cannot be determined.

In another case, a user may be satisfied with the current color reproducibility and may want to maintain the current multi-dimensional LUT even if the color reproducibility of the multi-dimensional LUT varies from the targeted color reproducibility. Hence, the update of the multi-dimensional LUT in accordance with the variation in the color reproducibility does not always meet the needs of the user.

A plurality of image forming apparatuses may be connected to constitute an image forming system. For example, a plurality of image forming apparatuses may be connected in series to constitute a so-called tandem image forming system or a plurality of image forming apparatuses may be connected via a network to constitute an image forming system. Ideally, every image forming apparatus in such a system should have the same color reproducibility; therefore, the image forming apparatuses are intended to have common color reproducibility (for example, refer to Japanese Patent Application Laid-Open No. 2007-137013).

In the above patent document, the color gamut of the image forming apparatuses is compressed and the color reproducibility gamut is shared among the image forming apparatuses. Unfortunately, the gradations of mixed colors may not match in the compressed color gamut. Optimal color reproducibility is achieved by updating the multi-dimensional LUTs of the image forming apparatuses to a common multi-dimensional LUT. In such a case, also, necessity of updating multi-dimensional LUT should be determined appropriately.

An object of the present invention is to readily and appropriately determine necessity of updating the multi-dimensional LUT.

In order to achieve the above object, according to the first aspect of a preferred embodiment of the present invention, there is provided an image forming apparatus including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which forms an image of the mixed-color pattern on the sheet with the image forming unit, compares color values representing color shades for each of the tones between an observed value of the image of the mixed-color pattern formed on the sheet and the reference value of the mixed-color pattern stored in the storage unit, and determines that the multi-dimensional LUT needs to be updated and updates the multi-dimensional LUT if a difference of the color values is determined to be large on the basis of a threshold value.

According to the second aspect of a preferred embodiment of the present invention, there is provided an image forming apparatus including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which forms an image of the mixed-color pattern on the sheet with the image forming unit, compares color values representing color shades for each of the tones between an observed value of the image of the mixed-color pattern formed on the sheet and the reference value of the mixed-color pattern stored in the storage unit, and updates the reference value of the mixed-color pattern stored in the storage unit to the observed value for each of the tones and maintains the current multi-dimensional LUT if the difference of the color values is determined to be large on the basis of a threshold value.

According to the third aspect of a preferred embodiment of the present invention, there is provided an image forming system including a plurality of image forming apparatuses which are connected in series including a first image forming apparatus serving as a reference and a second image forming apparatus not serving as a reference, each of the image forming apparatuses including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which updates the multi-dimensional LUT, wherein, each of the image forming apparatuses forms an image of the mixed-color pattern on the sheet, and the second image forming apparatus compares color values representing color shades for each of the tones between an observed value of the mixed-color pattern provided by the first image forming apparatus, which is a reference value, and an observed value of the mixed-color pattern provided by the second image forming apparatus, and determines that the multi-dimensional LUT of the second image forming apparatus needs to be updated and updates the multi-dimensional LUT if the difference of the color values is determined to be large on the basis of a threshold value.

According to the fourth aspect of a preferred embodiment of the present invention, there is provided an image forming system including a plurality of image forming apparatuses connected via a network, each of the image forming apparatuses including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which updates the multi-dimensional LUT, wherein, each of the image forming apparatuses forms an image of the mixed-color pattern on the sheet, compares color values representing color shades for each of the tones between an observed value of the image of the mixed-color pattern formed on the sheet and the reference value of the mixed-color pattern stored in the storage unit, and determines that the multi-dimensional LUT needs to be updated and updates the multi-dimensional LUT if the difference of the color values is determined to be large on the basis of a threshold value.

According to the fifth aspect of a preferred embodiment of the present invention, there is provided a method of updating a multi-dimensional LUT which is used by an image forming apparatus to convert a color space of image data to another color space of color materials used in image formation, the method including forming an image of a mixed-color pattern which includes a gradation of tones of a mixed color made of at least two colors on a sheet; determining whether a difference of the color values is large on the basis of a threshold value by comparing color values representing color shades for each of the tones between an observed value of the image of the mixed-color pattern on the sheet and a reference value of the mixed-color pattern; and updating the multi-dimensional LUT by determining that the multi-dimensional LUT needs to be updated if the difference is determined to be large.

According to the sixth aspect of a preferred embodiment of the present invention, there is provided a method of updating a multi-dimensional LUT which is used by an image forming apparatus to convert a color space of image data to another color space of color materials used in image formation, the method including forming an image of a mixed-color pattern which includes a gradation of tones of a mixed color made of at least two colors on a sheet; determining whether a difference of the color values is large on the basis of a threshold value by comparing color values representing color shades for each of the tones between an observed value of the image of the mixed-color pattern on the sheet and a reference value of the mixed-color pattern stored in the image forming apparatus; and updating the color value of the reference value of the mixed-color pattern stored in the image forming apparatus to the observed value for each of the tones and maintaining the current multi-dimensional LUT if the difference is determined to be large.

According to the seventh aspect of a preferred embodiment of the present invention, there is provided a method of updating a multi-dimensional LUT to convert a color space of image data to a color space of color materials used in image formation by a plurality of image forming apparatuses which are connected in series and include at least a first image forming apparatus serving as a reference and a second image forming apparatus not serving as a reference, the method including forming an image of a mixed-color pattern which includes a gradation of tones of a mixed color made of at least two colors on a sheet by each of the image forming apparatuses; determining whether the difference of the color values is large on the basis of a threshold value in the second image forming apparatus by comparing color values representing color shades for each of the tones between an observed value of the mixed-color pattern formed by the first image forming apparatus and an observed value of the mixed-color pattern formed by the second image forming apparatus; and updating the multi-dimensional LUT in the second image forming apparatus by determining that the multi-dimensional LUT of the second image forming apparatus needs to be updated if the difference is determined to be large.

According to the eighth aspect of a preferred embodiment of the present invention, there is provided a method of updating a multi-dimensional LUT to convert a color space of image data to another color space of color materials for image formation used by a plurality of image forming apparatuses connected via a network, the method including forming an image of a mixed-color pattern including a gradation of tones for a mixed color made of at least two colors on a sheet by each of the image forming apparatuses; determining whether the difference of the color values is large on the basis of a threshold value in each of the image forming apparatuses by comparing color values representing color shades for each of the tones between an observed value of the mixed-color pattern formed on the sheet and a reference value of the mixed-color pattern; and determining that the multi-dimensional LUT needs to be updated and updating the multi-dimensional LUT by each of the image forming apparatuses if the difference is determined to be large.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

An image forming apparatus, an image forming system, and a method of updating a multi-dimensional LUT according to embodiments of the present invention will now be described with reference to the accompanying drawings.

First Embodiment

Figure 1:
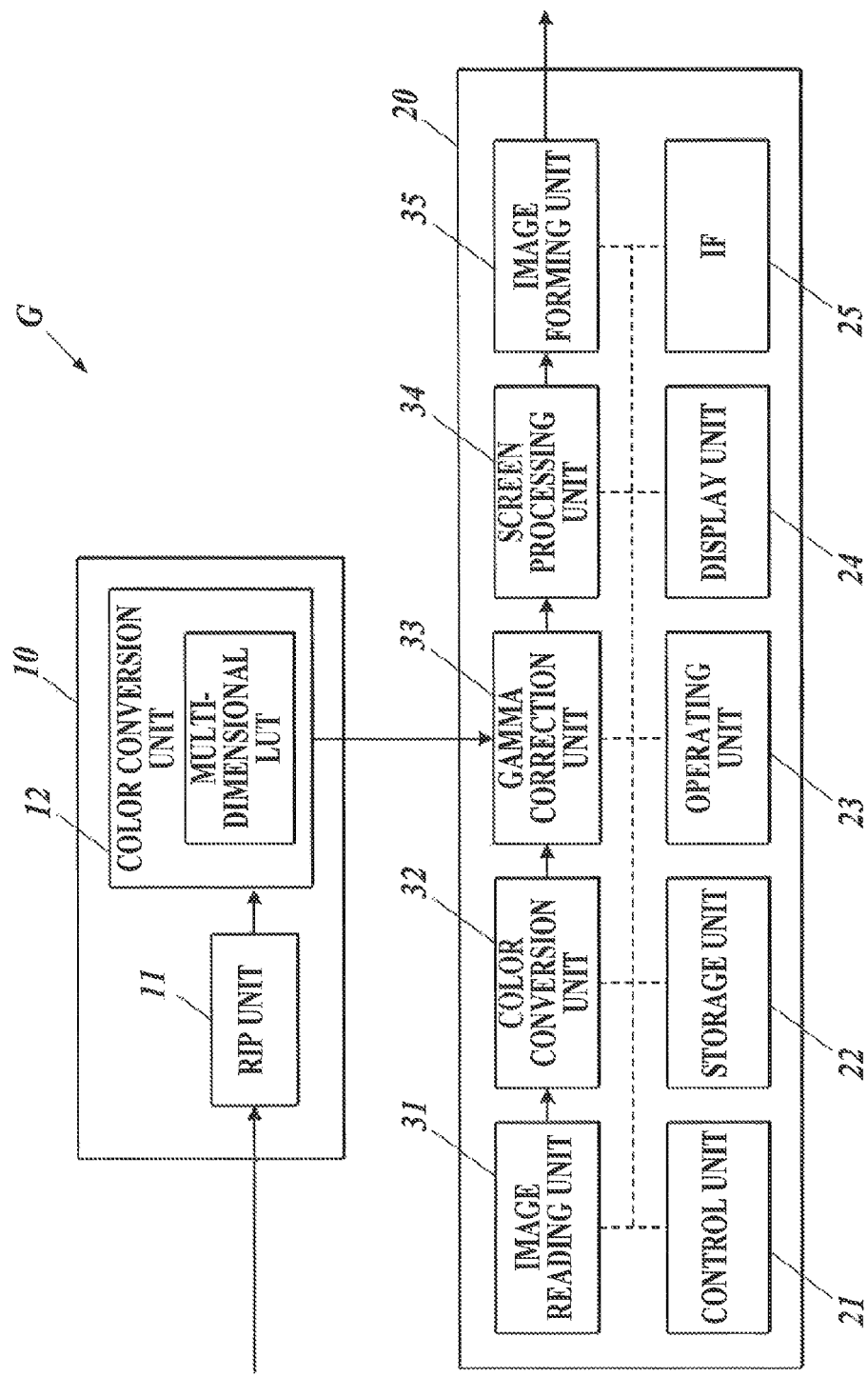
FIG. 1 illustrates an image forming apparatus according to a first embodiment.

FIG. 1 is a functional block diagram of an image forming apparatus G according to the first embodiment.

The image forming apparatus G can copy documents and document data prepared by a user with an application tool. The image forming apparatus G prints color images by using toners of four different colors: cyan (C), magenta (M), yellow (Y), and black (K).

As illustrated in FIG. 1, the image forming apparatus G includes a controller 10 that generates image data and a main body 20 that executes the printing process of the image data.

The controller 10 interprets PDL data transmitted from an external computer such as a personal computer and generates bitmap image data.

The controller 10 includes a raster image processor (RIP) 11 and a color conversion unit 12.

The RIP 11 rasterizes the PDL data and generates bitmap image data.

In the rasterizing process, the RIP 11 interprets the PDL data and prepares a display list and layout information. The display list contains intermediate data on an object such as size, color and attribute. The attribute of the object includes text, graphic and image. The layout information indicates page layout of objects. The RIP 11 prepares image data on each of the objects in the display list that is loaded onto a bitmap in accordance with the layout information for each page. The RIP 11 prepares attribute data representing the attribute of every pixel in the image data on the basis of the display list.

The color conversion unit 12 performs color conversion of the image data prepared by the RIP 11. The RIP 11 prepares image data for the C, M, Y, and K colors in accordance with the color materials used by the main body 20. The color conversion unit 12 performs color conversion of such image data for the C, M, Y, and K colors to obtain image data for the C, M, Y, and K colors that corresponds to the printing characteristics of the main body 20. The color conversion unit 12 has a multi-dimensional LUT called a color profile which is used for color conversion. The multi-dimensional LUT according to the embodiment is a four-dimensional LUT which receives values of combinations of the C, M, Y, and K colors and outputs values of the C, M, Y, and K colors.

The color conversion unit 12 sends the image data after the color conversion to the main body 20 via a video interface (VIF), for example.

The main body 20 includes a control unit 21, a storage unit 22, an operating unit 23, a display unit 24, an interface (IF) 25, an image reading unit 31, a color conversion unit 32, a gamma correction unit 33, a screen processing unit 34 and an image forming unit 35.

The control unit 21 includes a central processing unit (CPU) and a random access memory (RAM). The control unit 21 reads out and executes programs stored in the storage unit 22 and controls operation of the units in the main body 20.

The control unit 21 performs primary-color calibration and multi-color calibration. The control unit 21 calculates a γ correction curve from the observed values of a single-color pattern for primary-color calibration and calculates a γ correction curve from the observed values of the mixed-color pattern for multi-color calibration. The control unit 21 prepares a one-dimensional LUT of the calculated γ correction curve and updates a one-dimensional LUT of γ correction curve to be used by the gamma correction unit 33 for γ correction to the prepared one-dimensional LUT.

The control unit 21 updates a multi-dimensional LUT to be used by the color conversion unit 12 for color conversion. The control unit 21 prepares a new multi-dimensional LUT from the observed values of a color chart and updates a multi-dimensional LUT stored in the color conversion unit 12 to the prepared multi-dimensional LUT.

The storage unit 22 stores programs executed by the control unit 21 and other data. The storage unit 22 may be a non-volatile memory such as a hard disk.

The storage unit 22 stores a single-color pattern that is used for primary-color calibration, a mixed-color pattern that is used for multi-color calibration and a color chart used for updating the multi-dimensional LUT.

The single-color pattern includes patches arranged in a gradation of tones for each single color of C, M, Y and K.

The mixed-color pattern includes patches arranged in a gradation of tones for each mixed color which is made of at least two colors of C, M, Y and K.

The color chart is similar to the mixed-color pattern in that it includes patches arranged in a gradation of tones for each mixed color which is made of two or more colors of C, M, Y and K, however, the number of mixed colors and tones is extremely larger than the number of those in the mixed-color pattern.

The storage unit 22 stores reference values on the tones linked to the tones of the mixed colors in the mixed-color pattern. The reference values are target values of color reproducibility and each can be represented in a color space, such as RGB, YCrCb or L*a*b*.

The operating unit 23 includes a touch panel and operating keys and outputs operating signals corresponding to the operation of the touch panel and the operating keys to the control unit 21.

The display unit 24 displays an operating menu on a display, which is integrated with the touch panel, in accordance with control of the control unit 21.

The IF 25 is an interface such as a universal serial bus (USB).

The image reading unit 31 reads a document with a scanner and prepares image data by A/D conversion of the read image signal.

The color conversion unit 32 performs color conversion on the image data prepared by the image reading unit 31. The image data prepared in an RGB color space by the image reading unit 31 is converted to image data in a CMYK color space. The color conversion unit 32 stores a multi-dimensional LUT that outputs values of the CMYK colors corresponding to the input values of the RGB colors and performs color conversion by using the multi-dimensional LUT.

The gamma correction unit 33 performs γ correction on the input image data. The gamma correction unit 33 includes a one-dimensional LUT of a γ correction curve and performs γ correction on the basis of the one-dimensional LUT.

The screen processing unit 34 performs screen processing on the image data after γ correction and outputs the processed data to the image forming unit 35.

The image forming unit 35 forms a toner image based on the image data by using the C, M, Y, and K color toners.

Figure 2:
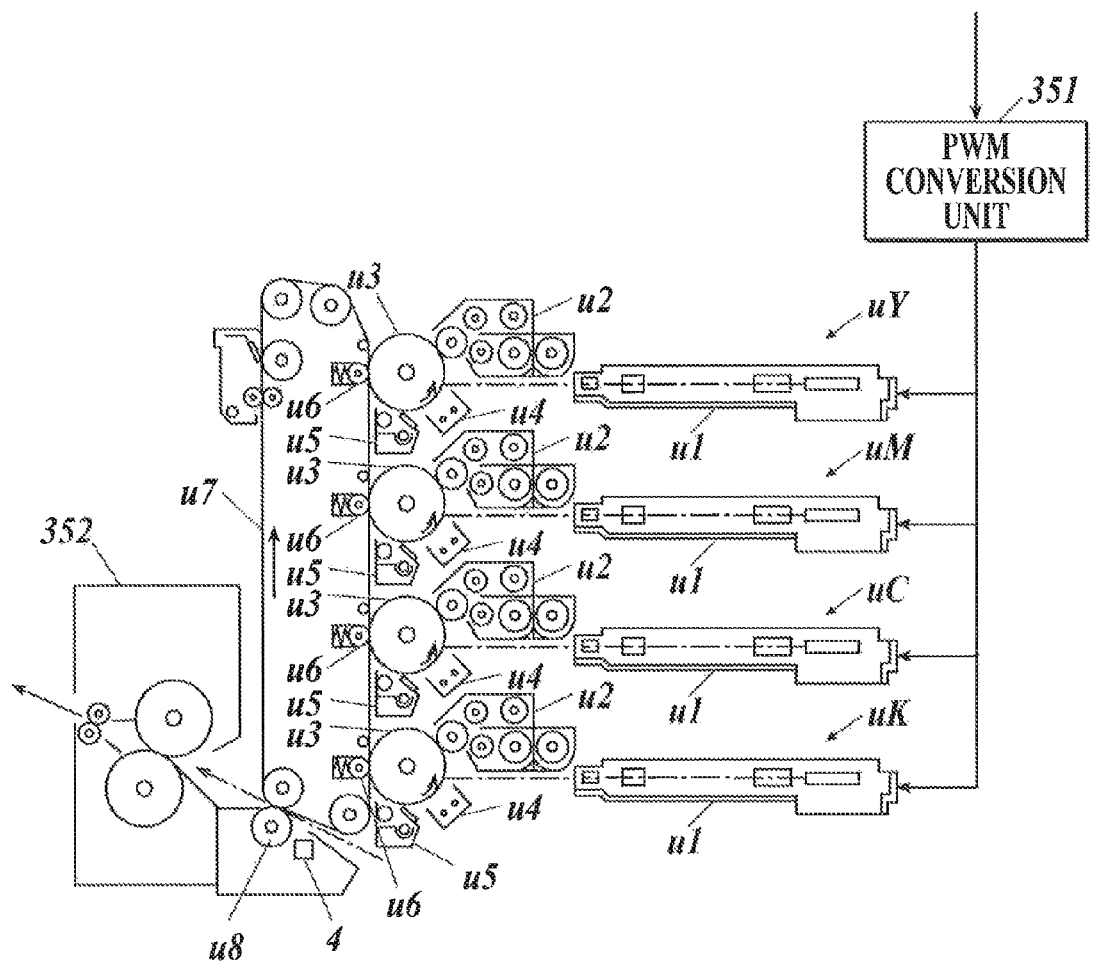
FIG. 2 illustrates an example configuration of an image forming unit of FIG. 1.

FIG. 2 illustrates an example configuration of the image forming unit 35.

As illustrated in FIG. 2, the image forming unit 35 includes a pulse width modulation (PWM) conversion unit 351, subunits uY, uM, uC, and uK for the four different color toners, an intermediate transfer belt u7, secondary transfer rollers u8 and a fixing device 352.

The subunits uY, uM, uC, and uK are provided for different toner colors for development but have the same configuration, each including an exposure element u1, a development element u2, a photoconductive drum u3, a charger u4, a cleaner u5 and a primary transfer roller u6. The photoconductive drums u3 of the subunits uY, uM, uC, and uK are disposed in series on the intermediate transfer belt u7.

Image data sets of C, M, Y, and K colors inputted from the screen processing unit 34 are PWM-converted by the PWM conversion unit 351 and outputted to the subunits uY, uM, uC, and uK. The chargers u4 of the subunits uY, uM, uC, and uK charge the respective photoconductive drums u3. Each exposure element u1 scans a laser beam across the surface of the charged photoconductive drum u3 on the basis of the PWM-converted image data to form an electrostatic latent image. The electrostatic latent image is developed at the development element u2 to form a toner image on the photoconductive drum u3. The toner image is transferred onto the intermediate transfer belt u7 as a result of the rotation of the photoconductive drum u3 and the primary transfer roller u6. The cleaner u5 removes the toner remaining on the photoconductive drum u3.

The subunits uY, uM, uC, and uK form toner images on the intermediate transfer belt u7 in order in synchronization with the rotation of the intermediate transfer belt u7. As a result, the toner images of the four colors are overlaid on the intermediate transfer belt u7 in the form of a color image.

A sheet is conveyed at a timing of the color image reaching the secondary transfer rollers u8 as a result of the rotation of the intermediate transfer belt u7. The color image is transferred from the intermediate transfer belt u7 onto the sheet by the pressure of the secondary transfer rollers u8. The color image on the sheet is then fixed by the fixing device 352 and the sheet is ejected.

A sensor 4 is disposed near the intermediate transfer belt u7 in order to detect the toner on the intermediate transfer belt u7 for calibration. The sensor 4 may be of any type, and may be an optical sensor such as a CCD.

The image forming apparatus G can determine necessity of updating the multi-dimensional LUT during the primary-color calibration.

Figure 3:
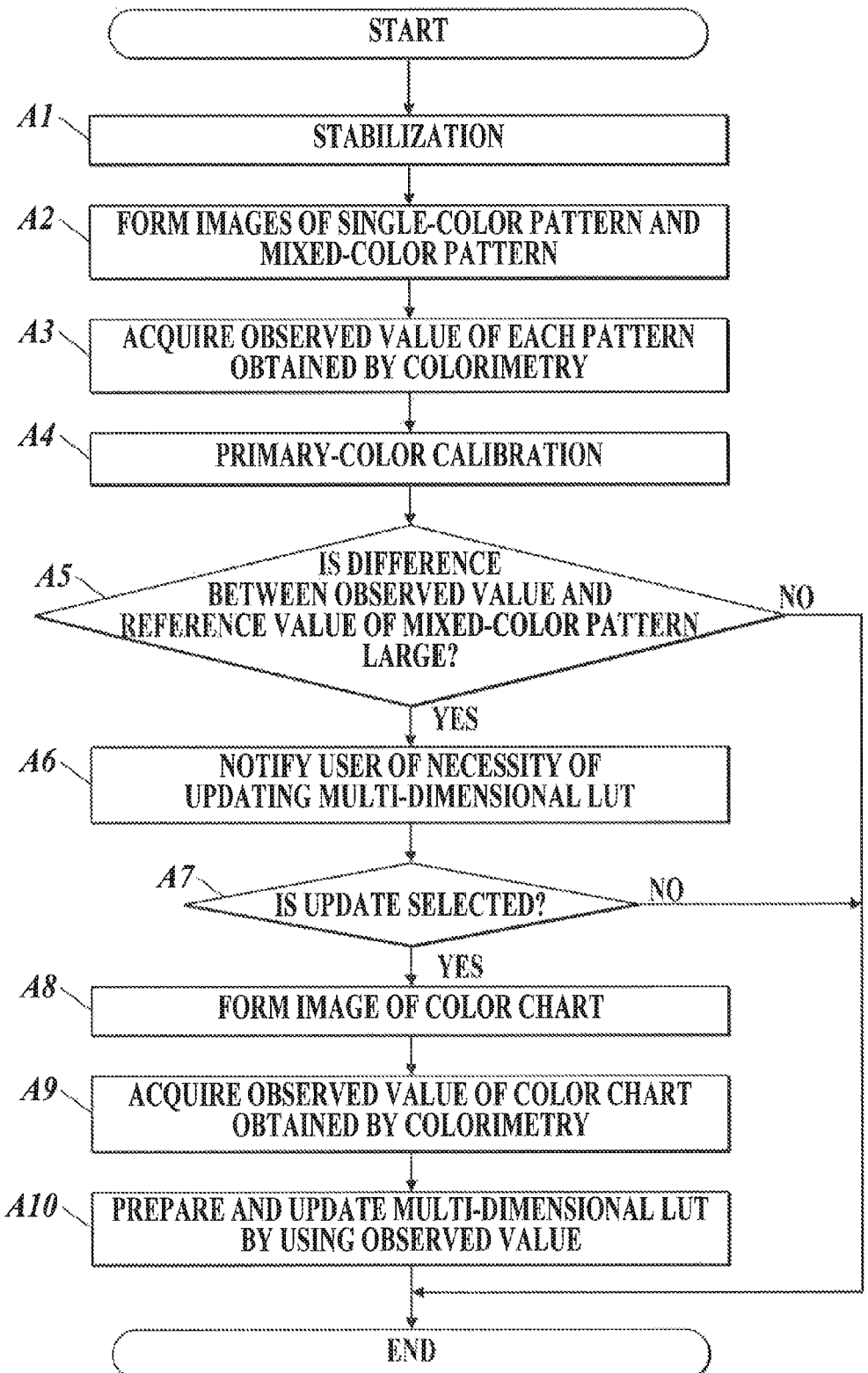
FIG. 3 is a flow chart of calibration carried out by the image forming apparatus according to the first embodiment.

FIG. 3 is a flow chart of the primary-color calibration.

As illustrated in FIG. 3, the image forming apparatus G starts with stabilization (Step A1).

The stabilization roughly adjusts a variation in density caused by the image forming unit 35 depending on the amount of toner attached to the intermediate transfer belt u7. Highly precise γ correction curves of primary colors can be prepared after establishment of the processing conditions of the image forming unit 35 through the stabilization. Specifically, the image forming unit 35 forms a toner image for adjustment on the intermediate transfer belt u7. Based on the current processing conditions, the control unit 21 establishes the processing conditions of the image forming unit 35 such as the charge potential of the photoconductive drum u3, the exposure of the exposure element u1 and the development potential of the development element u2 depending on the amount of toner attached to the intermediate transfer belt u7 detected by the sensor 4.

The image forming unit 35 forms a toner image which obtains a gradation of tones by screen processing on the intermediate transfer belt u7. The control unit 21 uses the observed values of the toner image received from the sensor 4 to calculate an engine γ curve corresponding to area gradation by screen processing. The engine γ curve is a γ correction curve obtained under the established processing conditions.

After the stabilization, the control unit 21 reads out, from the storage unit 22, the single-color pattern used for primary-color calibration and the mixed-color pattern used for multi-color calibration, performs γ correction on these patterns by using the engine γ curve acquired through stabilization, and outputs the γ-corrected patterns to the image forming unit 35. The image forming unit 35 forms a toner image of these patterns on a sheet (Step A2).

Figure 4:
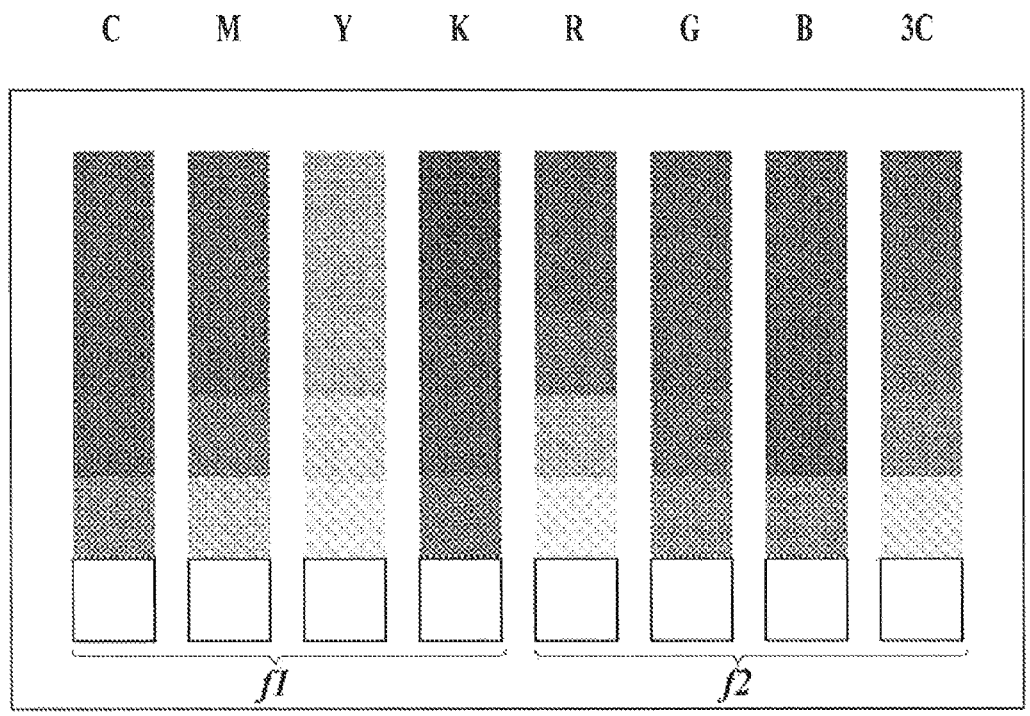
FIG. 4 illustrates examples of a single-color pattern and a mixed-color pattern.

FIG. 4 illustrates an example single-color pattern and an example mixed-color pattern.

The single-color pattern f1 has patches arranged in a gradation of tones for each of the C, M, Y, and K colors.

The mixed-color pattern f2 has patches arranged in a gradation of tones for each mixed color of the R, G, B, and 3C. The mixed color R is a 1:1 mixture of M and Y. The mixed color G is a 1:1 mixture of C and Y. The mixed color B is a 1:1 mixture of C and M. The mixed color 3C is a 1:1:1 mixture of C, M, and Y.

The mixed-color pattern and the single-color pattern are preferably formed on the same sheet for cost reduction. Alternatively, the mixed-color pattern and the single-color pattern may be formed on separate sheets so long as they are formed during the primary-color calibration.

Colorimetry is performed on the different tones of the single-color pattern and the mixed-color pattern formed on the same sheet to acquire the observed values of the patterns by the control unit 21 (Step A3). The colorimetric values of the single-color pattern can be used for the primary-color calibration, and the colorimetric values of the mixed-color pattern can be used for the multi-color calibration.

Any colorimetric method can be employed. For example, an operator may use a colorimeter to measure L*a*b* values and input the measured L*a*b* values to the control unit 21 by using the operating unit 23. The colorimeter and the image forming apparatus G may be connected via the IF 25 so that the control unit 21 directly receives the values from the colorimeter. The colorimetry may be performed with the image reading unit 31 in place of the colorimeter. An operator may use the image reading unit 31 to read the mixed-color pattern printed on a sheet and send the corresponding RGB values outputted from the image reading unit 31 to the control unit 21. The RGB values may be measured by using an optical sensor or a similar device that is disposed in the conveying path of the sheet.

The control unit 21 uses the observed values of the single-color pattern for primary-color calibration (Step A4). The control unit 21 performs primary-color calibration to calculate a γ correction curve by using the observed values of the single-color pattern and updates a γ correction curve to be used by the gamma correction unit 33 for γ correction to the calculated γ correction curve.

Figure 5:
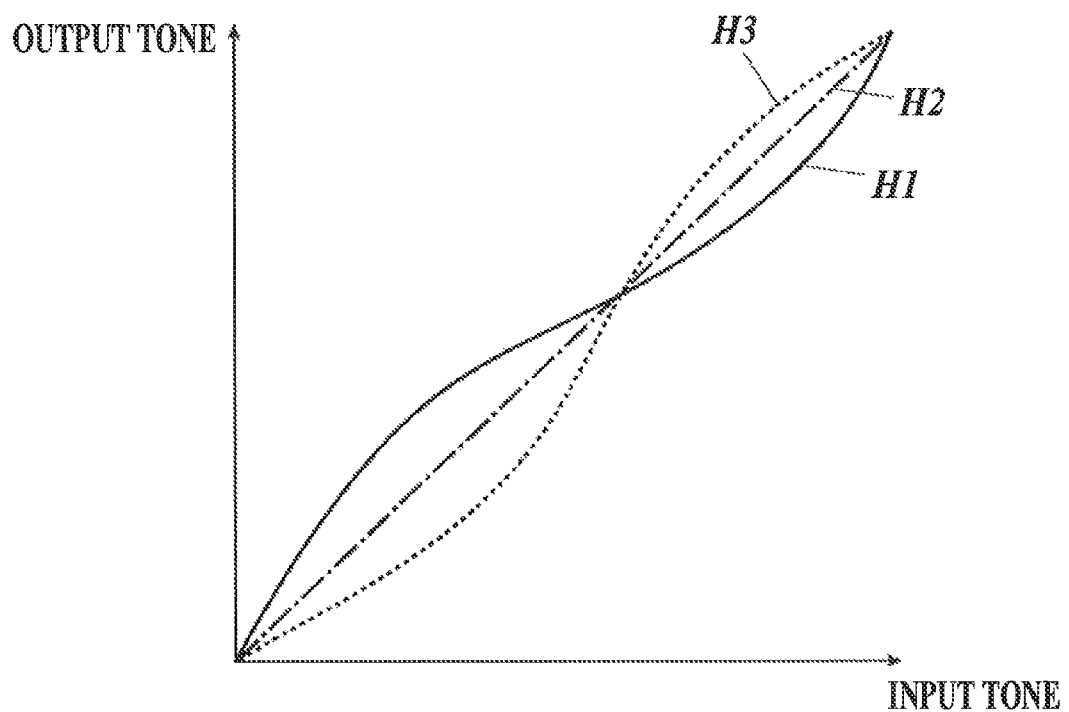
FIG. 5 is an example γ correction curve.

FIG. 5 illustrates an example γ correction curve.

In FIG. 5, a reproduced gradation curve H1 plots the observed values of the single-color pattern and represents the gradation characteristics of the current color reproducibility. A target gradation curve H2 represents the target gradation characteristics with an input value to output value ratio of 1:1. The control unit 21 acquires a γ correction curve H3, which represents the inverse of the reproduced gradation curve H1 with respect to the target gradation curve H2.

The control unit 21 determines the difference between the observed values and the reference values for each of the tones of the mixed-color pattern on the basis of a threshold value (Step A5).

That is, the control unit 21 compares the difference between observed color values and reference color values representing color shades of mixed colors with a threshold value. For example, for observed RGB values, the control unit 21 converts the RGB color space into a YCrCb color space. Y is a color value representing brightness, and Cr and Cb are color values representing color shades.

Figure 6:
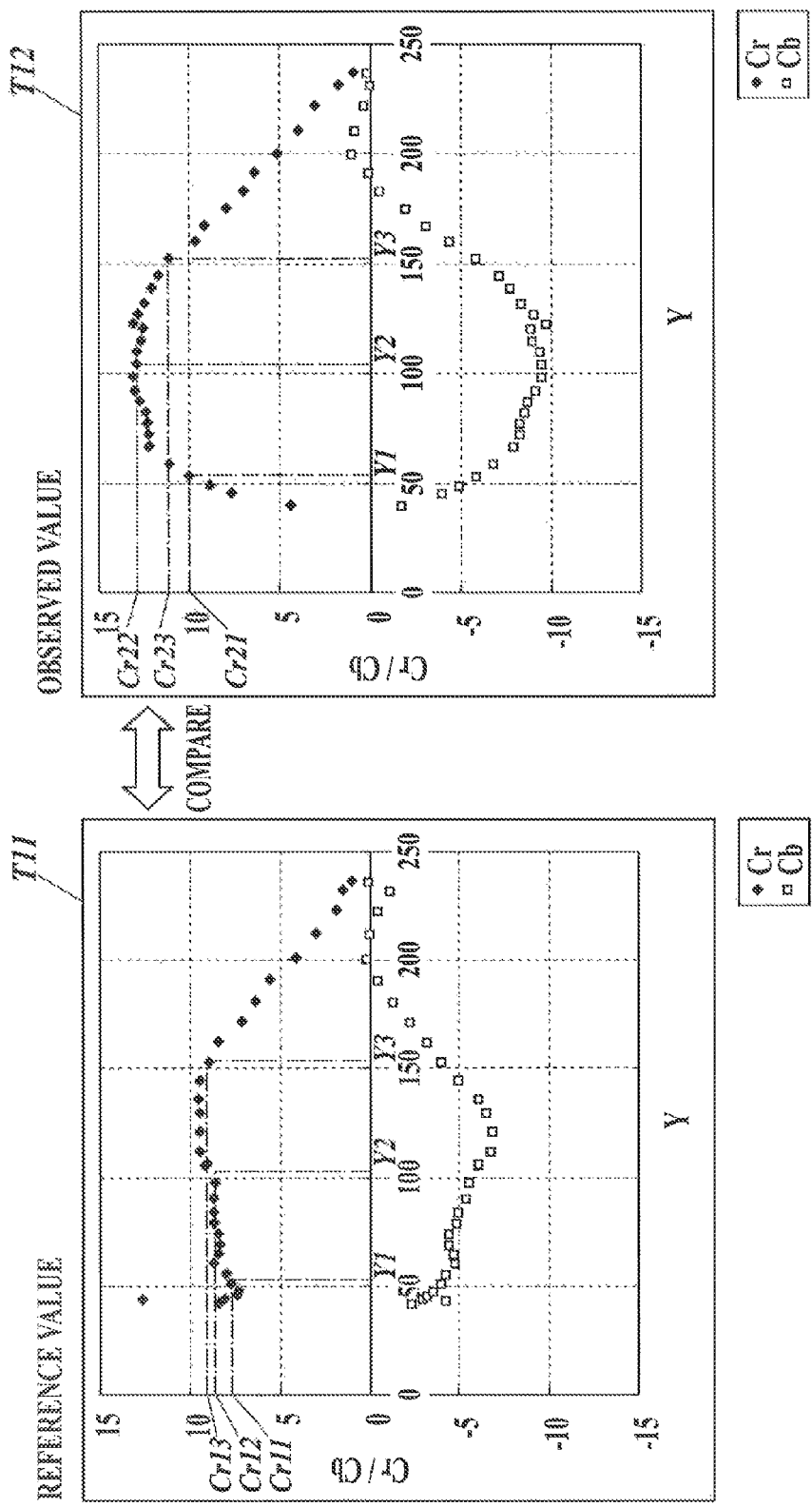
FIG. 6 illustrates graphs plotting reference color values Cr and Cb and observed color values Cr and Cb.

FIG. 6 illustrates graphs T11 and T12 plotting the color values Cr and Cb of the mixed color 3C versus the brightness Y. The reference color values Cr and Cb are plotted in graph Tl1, and the observed color values Cr and Cb are plotted in graph T12.

The control unit 21 extracts reference color values Cr11, Cr12 and Cr13 and observed color values Cr21, Cr22 and Cr23 which respectively correspond to arbitrary values of brightness Y1, Y2 and Y3. If a reference or observed color value Cr corresponding to brightness Y1, Y2 or Y3 does not exist, the control unit 21 acquires an interpolated color value Cr by linearly-interpolating the reference color values or the observed color values. The control unit 21 compares the average of differences between the color values Cr11 and Cr21, between the color values Cr12 and Cr22 and between the color values Cr13 and Cr23 with a threshold value. The control unit 21 determines that the color shades represented by the observed values have shifted greatly from the color shades represented by the reference values if the average is larger than or equal to the threshold value. The control unit 21 determines that the color shades represented by the observed values are the same to or in an acceptable difference with the color shades represented by the reference values if the average is smaller than the threshold value.

Three color values are extracted and used for comparison. However, the number of color values to be extracted is not limited. Comparison with a large number of color values achieves accurate determination.

The control unit 21 may compare the difference in area of the characteristic curve between reference color values Cr and Cb and observed color values Cr and Cb, for example, with a threshold value to determine the difference between the color values.

The control unit 21 preferably determines a coefficient of correlation of observed color values and reference color values, compares the coefficient of correlation with a threshold value, and determines the difference between the color values. The use of the coefficient of correlation enables accurate determination of a shift of the color shades represented by the observed color values from the color shades represented by the reference color values.

The coefficient of correlation is a statistical value representing the similarity between two variables and is determined by dividing the covariance values of the two variables by their respective standard deviations. The coefficient of correlation is a real number within the range of −1 to 1. A coefficient of correlation approximating 1 or −1 indicates that the observed color values Cr and Cb and the reference color values Cr and Cb are similar, whereas a coefficient of correlation approximating zero indicates that the observed color values Cr and Cb and the reference color values Cr and Cb are different. Thus, when a threshold value value is represented by Th (Th is a positive value smaller than one), the control unit 21 determines that the difference between the observed color values and the reference color values is larger if the coefficient of correlation is within a range of −Th to Th. In contrast, the control unit 21 determines that the difference between the observed color values and the reference color values is small if the coefficient of correlation is larger than or equal to −1 and smaller than −Th or larger than Th and smaller than or equal to 1.

Figure 7:
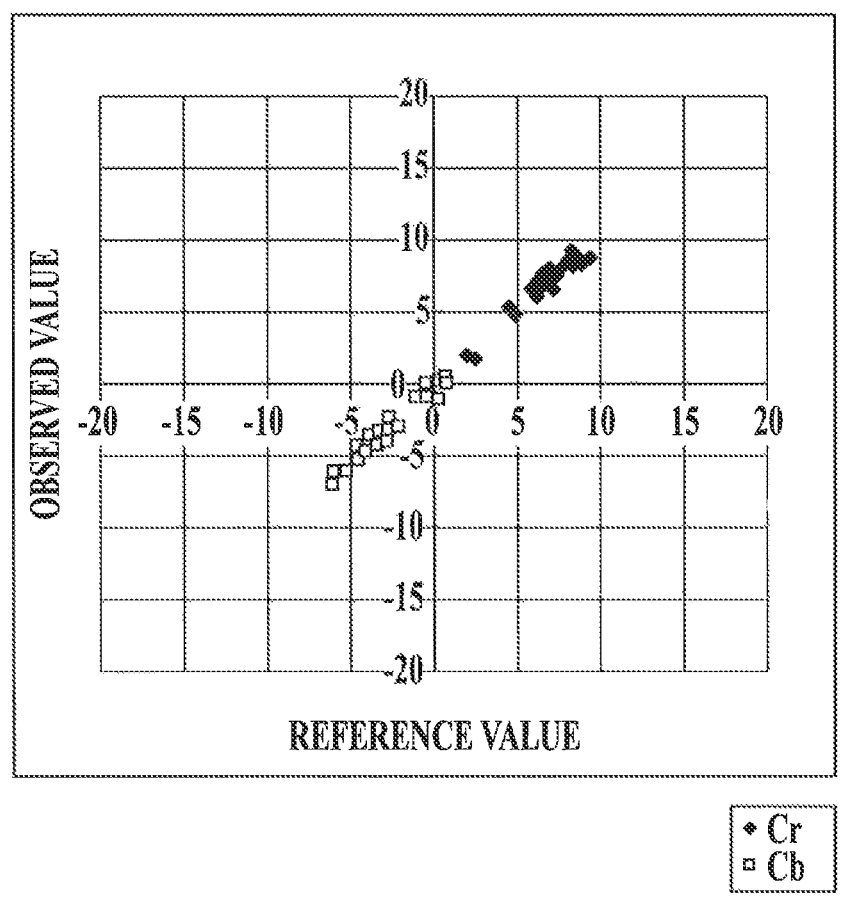
FIG. 7 is a graph representing an example profile of the reference color values Cr and Cb and the observed color values Cr and Cb not requiring update of the multi-dimensional LUT.
Figure 8:
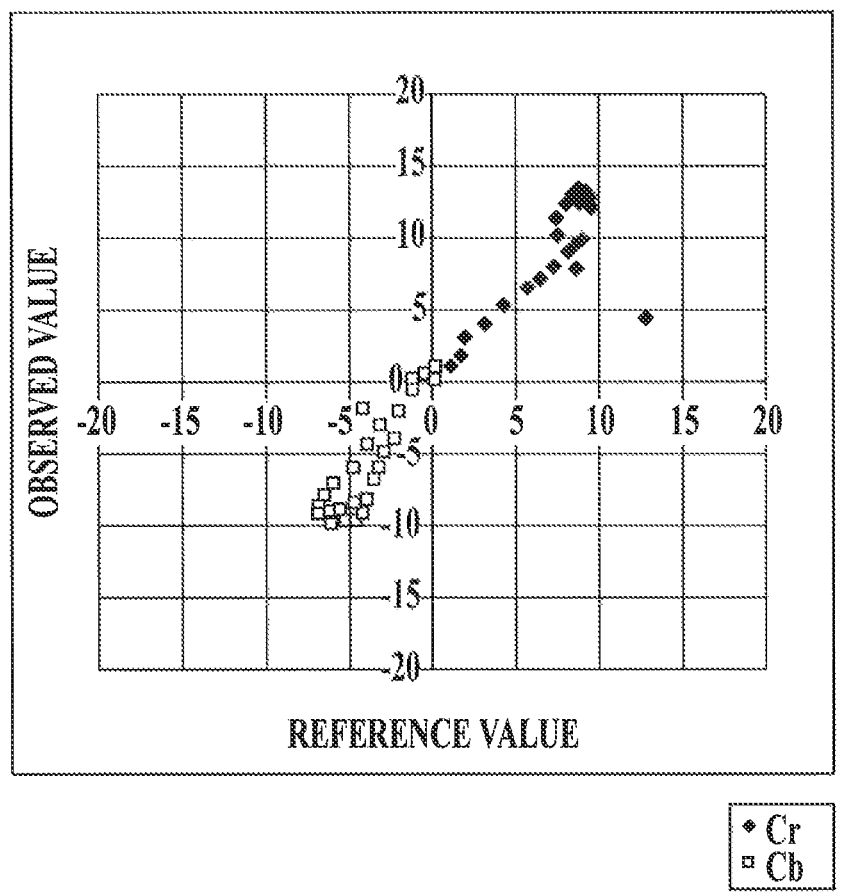
FIG. 8 is a graph representing an example profile of the reference color values Cr and Cb and the observed color values Cr and Cb requiring update of the multi-dimensional LUT.

FIGS. 7 and 8 are graphs plotting the reference color values Cr and Cb and the observed color values Cr and Cb which are shown in FIG. 6 versus brightness Y. The x-axis represents the reference color values, and the y-axis represents the observed color values.

The graph in FIG. 7 represents a profile of the color values Cr and Cb having a small difference between the observed values and the reference values and having a coefficient of correlation approximating 1 or −1.

The graph in FIG. 8 represents a profile of the color values Cr and Cb having a large difference between the observed values and the reference values and having a coefficient of correlation approximating zero.

The control unit 21 can also determine the mean square error between the observed color values and the reference color values and compare the determined mean square error with a threshold value. The control unit 21 determines that the difference between the reference color values and the observed color values is large if the mean square error is larger than or equal to the threshold value or determines that the difference between the reference color values and the observed color values is small if the mean square error is smaller than the threshold value. Similar to the coefficient of correlation, the mean square error can also be used to accurately determine the shift of color shades represented by the observed color values from the color shades represented by reference color values.

Values in an observed L*a*b* color space include brightness L and color values a* and b* representing color shades. Similar to the color values Cr and Cb, the control unit 21 compares the shift of the observed color values a* and b* from the reference color values a* and b* with a threshold value.

If the difference is not determined to be large on the basis of the threshold value (N in Step A5), a shift from the reference value is not observed or within an acceptable range, and the control unit 21 determines that the update of the multi-dimensional LUT is not required. Then, the image forming apparatus G ends the process and enters a stand-by mode.

If the difference is determined to be large on the basis of the threshold value (Y in Step A5), the shift of the color shades from the reference values is large, and the control unit 21 determines that the update of the multi-dimensional LUT is required.

Before the update of the multi-dimensional LUT, the control unit 21 notifies the user of a variation in the color reproducibility and the necessity of updating the multi-dimensional LUT to set the color reproducibility to a targeted value (Step A6). It is preferable to notify the user of the necessity of updating the multi-dimensional LUT in advance because the update of the multi-dimensional LUT requires time and the image forming apparatus G cannot be used during the update. Any method of notification may be used to allow a user to select the update. For example, the control unit 21 instructs the display unit 24 to display a notification of the necessity of updating multi-dimensional LUT and a menu that allows the user to select the update.

If the user does not select the update (N in Step A7), the control unit 21 ends the process and enters a stand-by mode.

If the user selects the update (Y in Step A7), the control unit 21 reads out the color chart to be used for updating the multi-dimensional LUT from the storage unit 22 and sends the color chart to the gamma correction unit 33. The gamma correction unit 33 performs γ-correction on the color chart and sends the γ-corrected color chart to the image forming unit 35. The image forming unit 35 forms a toner image of the color chart on a sheet (Step A8).

Similar to the single-color pattern, the control unit 21 acquires observed values obtained by colorimetry on the toner image of the color chart on the sheet (Step A9). The control unit 21 prepares a multi-dimensional LUT by using the acquired colorimetric values and rewrites or updates the multi-dimensional LUT used by the color conversion unit 12 to the newly prepared multi-dimensional LUT (Step A10).

During preparation of the multi-dimensional LUT, the control unit 21 calculates the input values and output values of the grid points in the multi-dimensional LUT on the basis of the relationships between the CMYK tonal values of patches on the color chart and the respective observed tonal values. If the CMYK tonal values and the observed tonal values do not directly correspond to the grid points, the control unit 21 interpolates the CMYK tonal values and the observed tonal values to calculate the input values and output values for the grid points.

Any known method of preparing the multi-dimensional LUT can be used; for example, those disclosed in Japanese Patent Application Laid-Open Nos. 2004-120483 and 2000-196905.

As described above, according to the first embodiment, the image forming apparatus G includes an image forming unit 35 which forms an image on a sheet by using color materials of a plurality of colors on the basis of image data; a color conversion unit 12 which converts a color space of the image data to a color space of the color materials used by the image forming unit by using a multi-dimensional LUT; a storage unit 22 which stores a mixed-color pattern including a gradation of tones of a mixed color and a reference value of each of the tones, the mixed color made of at least two colors among the plurality of colors; and a control unit 21 which forms an image of the mixed-color pattern on the sheet with the image forming unit 35, compares color values representing color shades for each of the tones between an observed value of the image of the mixed-color pattern formed on the sheet and the reference value of the mixed-color pattern stored in the storage unit, and determines that the multi-dimensional LUT needs to be updated and updates the multi-dimensional LUT if a difference of the color values is determined to be large on the basis of a threshold value.

Thus, a large variation in color reproducibility that requires the update of a multi-dimensional LUT can be readily determined by using mixed-color patterns that can be readily calorimetrically measured, without preparation of a color chart containing an extremely large number of mixed colors and tones. A comparison of color values representing color shades of a mixed color between reference values and observed values in a mixed-color pattern leads to objective determination of a larger shift of the current color reproducibility from the targeted color reproducibility. Thus, necessity of updating the multi-dimensional LUT can be determined readily and appropriately.

The control unit 21 carries out primary-color calibration by using a single-color pattern including a gradation of tones, forms the mixed-color pattern by the image forming unit 35 during the primary-color calibration and compares the observed value of the mixed-color pattern with the reference value.

Thus, necessity of updating the multi-dimensional LUT can be determined during the primary-color calibration, without colorimetry of the color chart or the completion of the primary-color calibration.

In the calibration illustrated in FIG. 3, the primary-color calibration is carried out before Step A5 of determining the update of the multi-dimensional LUT. However, the primary-color calibration may be carried out after Step A5 so long as the primary-color calibration is performed before the update of the multi-dimensional LUT.

The present invention is not limited to the above first embodiment, which can be modified into various forms within the scope of the invention.

For example, the update of the multi-dimensional LUT can be determined on the multi-dimensional LUT which is used in color conversion by the color conversion unit 32 of the main body 20 similarly as in the multi-dimensional LUT which is used by the color conversion unit 12 of the controller 10.

A toner image of the mixed-color pattern is formed during primary-color calibration, and the observed values of the toner image are used for determining the update of the multi-dimensional LUT. A mixed-color pattern is formed during the multi-color calibration. The control unit 21 can use the observed values of the mixed-color pattern to determine the update of the multi-dimensional LUT during multi-color calibration.

The formation of a mixed-color pattern and the determination of the update of the multi-dimensional LUT may be carried out at any timing other than the primary-color or multi-color calibration.

Second Embodiment

An image forming apparatus according to the second embodiment has the same configuration as the image forming apparatus G according to the first embodiment, however, carries out a different calibration process. The components of the image forming apparatus according to the second embodiment, which are similar to those of the image forming apparatus G according to the first embodiment, are designated by the same reference numerals, and duplicated drawings and descriptions are omitted.

As illustrated in FIGS. 1 and 2, the image forming apparatus G according to the second embodiment includes a controller 10 and a main body 20.

Figure 9:
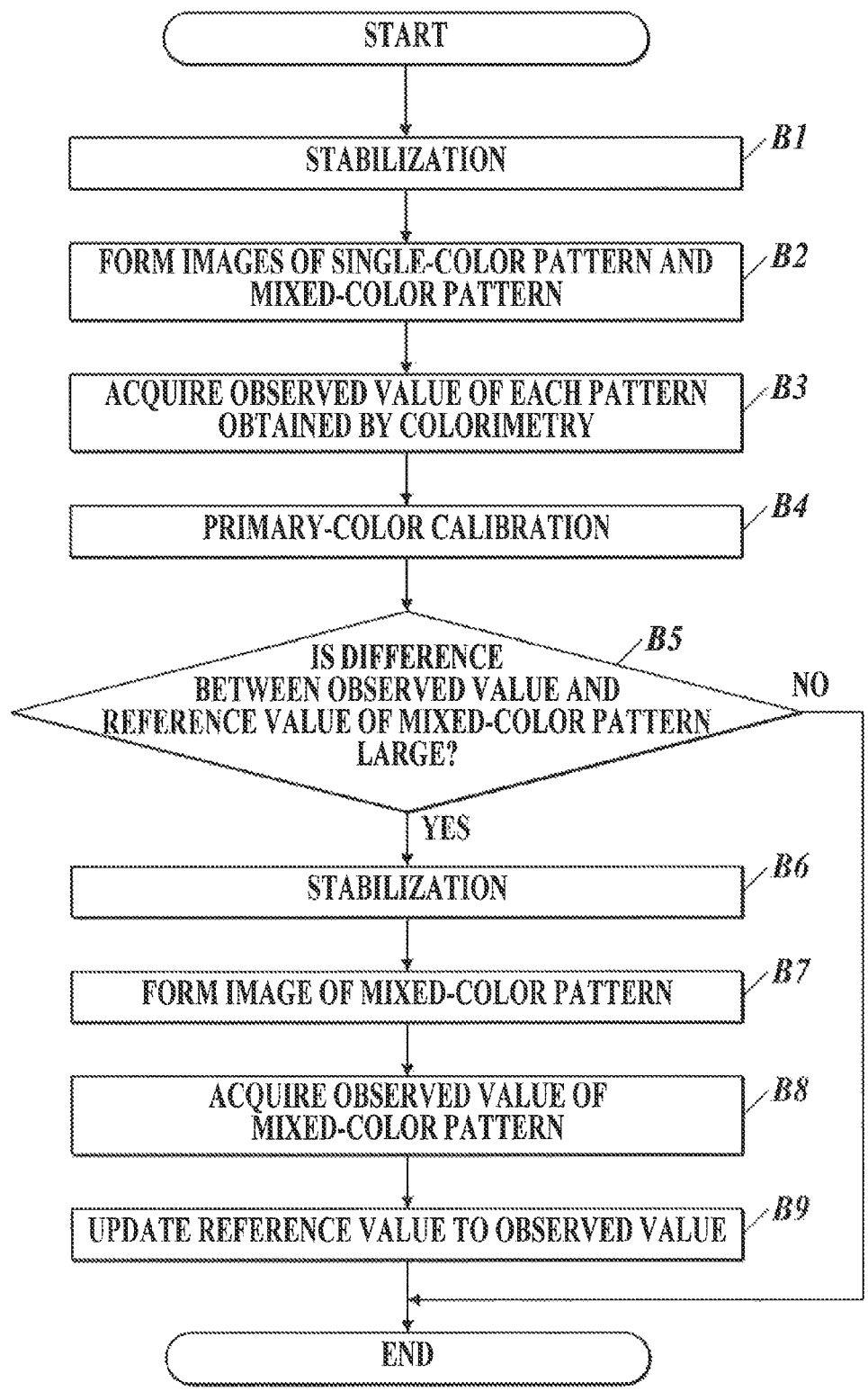
FIG. 9 is a flow chart of calibration carried out by an image forming apparatus according to a second embodiment.

FIG. 9 is a flow chart of the primary-color calibration carried out by the image forming apparatus G according to the second embodiment.

As illustrated in FIG. 9, the image forming apparatus G starts with stabilization (Step B1).

The stabilization roughly adjusts a variation in density caused by the image forming unit 35 depending on the amount of toner attached to the intermediate transfer belt u7. Highly precise γ correction curves of primary colors can be prepared after the establishment of the processing conditions of the image forming unit 35 through the stabilization. Specifically, the image forming unit 35 forms a toner image for adjustment on the intermediate transfer belt u7. Based on the current processing conditions, the control unit 21 establishes the processing conditions of the image forming unit 35, such as the charge potential of the photoconductive drum u3, the exposure of the exposure element u1 and the development potential of the development element u2 depending on the amount of toner attached to the intermediate transfer belt u7 detected by the sensor 4.

The image forming unit 35 forms a toner gradation image by screen processing on the intermediate transfer belt u7. The control unit 21 uses the observed values of the toner image received from the sensor 4 to calculate engine γ curves corresponding to the area gradation by screen processing. The engine γ curves are γ correction curves obtained under the established processing conditions.

After the stabilization, the control unit 21 reads out, from the storage unit 22, the single-color pattern used for primary-color calibration and the mixed-color pattern used for multi-color calibration, performs γ correction on these patterns by using the engine γ curves acquired through the stabilization, and outputs the γ-corrected patterns to the image forming unit 35. The image forming unit 35 forms a toner image of these patterns on a sheet (Step B2).

FIG. 4 illustrates an example single-color pattern and an example mixed-color pattern.

The single-color pattern f1 has patches arranged in a gradation of tones for each of the C, M, Y, and K colors.

The mixed-color pattern f2 has patches arranged in a gradation of tones for each mixed color of the R, G, B, and 3C. The mixed color R is a 1:1 mixture of M and Y. The mixed color G is a 1:1 mixture of C and Y. The mixed color B is a 1:1 mixture of C and M. The mixed color 3C is a 1:1:1 mixture of C, M, and Y.

The mixed-color pattern and the single-color pattern are preferably formed on the same sheet for cost reduction. Alternatively, the mixed-color pattern and the single-color pattern may be formed on separate sheets so long as they are formed during the primary-color calibration.

Colorimetry is performed on the different tones of the single-color pattern and the mixed-color pattern formed on the same sheet to acquire observed values of the patterns by the control unit 21 (Step B3). The colorimetric values of the single-color pattern can be used for the primary-color calibration, and the colorimetric values of the mixed-color pattern can be used for the multi-color calibration.

Any colorimetric method can be employed. For example, an operator may use a colorimeter to measure L*a*b* values and input the measured L*a*b* values to the control unit 21 by using the operating unit 23. The colorimeter and the image forming apparatus G may be connected via the IF 25 so that the control unit 21 directly receives the values from the colorimeter. The colorimetry may be performed with the image reading unit 31 in place of the colorimeter. An operator may use the image reading unit 31 to read the mixed-color pattern printed on a sheet and send the corresponding RGB values outputted from the image reading unit 31 to the control unit 21. The RGB values may be measured by using an optical sensor or a similar device that is disposed in the conveying path of the sheet.

The control unit 21 uses the observed values of the single-color pattern for primary-color calibration (Step B4). The control unit 21 performs primary-color calibration to calculate the γ correction curve by using the observed values of the single-color pattern and updates a γ correction curve used by the gamma correction unit 33 for γ correction to the calculated γ correction curve.

FIG. 5 illustrates an example γ correction curve.

In FIG. 5, a reproduced gradation curve H1 plots the observed values of the single-color pattern and represents the gradation characteristics of the current color reproducibility. A targeted gradation curve H2 represents the targeted gradation characteristics with an input value to output value ratio of 1:1. The control unit 21 acquires a γ correction curve H3 which represents the inverse of the reproduced gradation curve H1 with respect to the targeted gradation curve H2.

The control unit 21 determines the difference between the observed values and the reference values for each of the tones in the mixed-color pattern on the basis of a threshold value (Step B5).

That is, the control unit 21 compares the difference between observed color values and reference color values representing color shades of mixed colors with a threshold value. For example, for observed RGB values, the control unit 21 converts the RGB color space into a YCrCb color space, Y is a color value representing brightness, and Cr and Cb are color values representing color shades.

FIG. 6 illustrates graphs T11 and T12 plotting the color values Cr and Cb of the mixed color 3C versus the brightness Y. The reference color values Cr and Cb are plotted in graph T11, and the observed color values Cr and Cb are plotted in graph T12.

The control unit 21 extracts reference color values Cr11, Cr12 and Cr13 and observed color values Cr21, Cr22 and Cr23, which respectively correspond to arbitrary values of brightness Y1, Y2 and Y3. If a reference or observed color value Cr corresponding to brightness Y1, Y2, and Y3 does not exist, the control unit 21 acquires an interpolated color value Cr by linearly-interpolating the reference color values or the observed color values. The control unit 21 compares the average of the differences between the color values Cr11 and Cr21, between the color values Cr12 and Cr22 and between the color values Cr13 and Cr23 with a threshold value. The control unit 21 determines that the color shades represented by the observed values have shifted greatly from the color shades represented by the reference values if the average is larger than or equal to the threshold value. The control unit 21 determines that the color shades represented by the observed values are the same to or in an acceptable difference with the color shades represented by the reference values if the average is smaller than the threshold value.

Three color values are extracted and used for comparison. However, the number of color values to be extracted is not limited. Comparison with a large number of color values achieves accurate determination.

The control unit 21 may compare the difference in the area of the characteristic curves between reference color values Cr and Cb and observed color values Cr and Cb, for example, with a threshold value to determine the difference between the color values.

The control unit 21 preferably determines a coefficient of correlation of observed color values and reference color values, compares the coefficient of correlation with a threshold value, and determines the difference between the color values. The use of the coefficient of correlation enables accurate determination of a shift of the color shades represented by the observed color values from the color shades represented by the reference color values.

The coefficient of correlation is a statistical value representing the similarity between two variables and is determined by dividing the covariance values of the two variables by their respective standard deviations. The coefficient of correlation is a real number within the range of $-1$ to $1$. A coefficient of correlation approximating $1$ or $-1$ indicates that the observed color values Cr and Cb and the reference color values Cr and Cb are similar, whereas a coefficient of correlation approximating zero indicates that the observed color values Cr and Cb and the reference color values Cr and Cb are different. Thus, when a threshold value value is represented by Th (Th is a positive value smaller than one), the control unit 21 determines that the difference between the observed color values and the reference color values is larger if the coefficient of correlation is within a range of $-Th$ to $Th$. In contrast, the control unit 21 determines that the difference between the observed color values and the reference color values is small if the coefficient of correlation is larger than or equal to $-1$ and smaller than $-Th$ or larger than $Th$ and smaller than or equal to $1$.

FIGS. 7 and 8 are graphs plotting the reference color values Cr and Cb and the observed color values Cr and Cb which are shown in FIG. 6, versus brightness Y. The x-axis represents the reference color values, and the y-axis represents the observed color values.

The graph in FIG. 7 represents a profile of the color values Cr and Cb having a small difference between the observed values and the reference values and having a coefficient of correlation approximating $1$ or $-1$.

The graph in FIG. 8 represents a profile of the color values Cr and Cb having a large difference between the observed values and the reference values and having a coefficient of correlation approximating zero.

The control unit 21 can also determine the mean square error between the observed color values and the reference color values and compare the determined mean square error with a threshold value. The control unit 21 determines that the difference between the reference color values and the observed color values is large if the mean square error is larger than or equal to the threshold value and determines that the difference between the reference color values and the observed color values is small if the mean square error is smaller than the threshold value. Similar to the coefficient of correlation, the mean square error can also be used to accurately determine the shift of color shades represented by the observed color values from the reference color values.

Values in an observed L*a*b* color space include brightness L and color values a* and b* representing color shades. Similar to the color values Cr and Cb, the control unit 21 compares the shift of the observed color values a* and b* from the reference color values a* and b* based on a threshold value.

If the control unit 21 determines that the difference is not large on the basis of the threshold value (N in Step B5), a shift from the reference value is not observed or within an acceptable range, and the update of the multi-dimensional LUT is not required. Then, the image forming apparatus G ends the process and enters a stand-by mode.

If the control unit 21 determines that the difference is large on the basis of the threshold value (Y in Step B5), the shift of the color shades from the reference values is large, and the update of the multi-dimensional LUT is required.

The image forming apparatus G carries out the stabilization again (Step B6). The image forming unit 35 forms an image of a mixed-color pattern which is γ-corrected on the basis of the engine γ curve acquired through the stabilization, on a sheet (Step B7). Upon the colorimetry of the toner image of the mixed-pattern on the sheet, the control unit 21 acquires colorimetric values (Step B8). The control unit 21 updates reference values of the mixed-pattern stored in the storage unit 22 to the acquired colorimetric values as new reference values (Step B9).

The update of the reference values of the mixed-color pattern is changing targeted color characteristics to the current color characteristics. Since the current color characteristics are the same as the targeted color characteristics, and the current multi-dimensional LUT corresponds to the targeted color characteristics, the multi-dimensional LUT does not require update at this point.

The reference values can be updated by using the observed values of the mixed-color pattern acquired in Step B3. It is, however, preferable to acquire reference values approximating the current color reproducibility through the colorimetry of the mixed-color pattern formed again, as described above.

After update of the reference values, the image forming apparatus G ends the process and enters a stand-by mode.

As described above, according to the second embodiment, the image forming apparatus G includes an image forming unit 35 which forms an image on a sheet by using color materials of a plurality of colors on the basis of image data; a color conversion unit 12 which converts a color space of the image data to a color space of the color materials used by the image forming unit by using a multi-dimensional LUT; a storage unit 22 which stores a mixed-color pattern including a gradation of tones of a mixed color and a reference value of each of the tones, the mixed color made of at least two colors among the plurality of colors; and a control unit 21 which forms an image of the mixed-color pattern on the sheet with the image forming unit, compares color values representing color shades for each of the tones between an observed value of the image of the mixed-color pattern formed on the sheet and the reference value of the mixed-color pattern stored in the storage unit, and updates the reference value of the mixed-color pattern stored in the storage unit to the observed value for each of the tones and maintains the current multi-dimensional LUT if the difference of the color values is determined to be large on the basis of a threshold value.

Thus, a large variation in color reproducibility that requires the update of a multi-dimensional LUT can be readily determined by using mixed-color patterns that can be readily colorimetrically measured, without preparation of a color chart containing an extremely large number of mixed colors and tones. A comparison of color values representing color shades of a mixed color between reference values and observed values in a mixed-color pattern leads to objective determination of a larger shift of the current color reproducibility from the targeted color reproducibility. Thus, necessity of updating the multi-dimensional LUT can be determined readily and appropriately.

Further, according to the second embodiment, the reference values of the mixed-color pattern are updated in accordance with the variation in the color reproducibility; thus, targeted color reproducibility is set to the current color reproducibility, and the current multi-dimensional LUT, which is the same as the current color reproducibility, can be kept unchanged.

The control unit 21 carries out primary-color calibration by using a single-color pattern including a gradation of tones, forms the mixed-color pattern by the image forming unit 35 during the primary-color calibration and compares the observed values of the mixed-color pattern with the reference values.

Thus, necessity of updating the multi-dimensional LUT can be determined during the primary-color calibration, without colorimetry of the color chart or the completion of the primary-color calibration.

In the calibration illustrated in FIG. 9, the primary-color calibration is carried out before Step B5 of determining the update of the multi-dimensional LUT. However, the primary-color calibration may be carried out after Step B5 so long as the primary-color calibration is performed before the update of the multi-dimensional LUT.

The present invention is not limited to the second embodiment, which can be modified into various forms within the scope of the invention.

For example, the first and second embodiments may be combined to allow the user to select the update of the multi-dimensional LUT to correspond to the originally targeted color reproducibility or to the current color reproducibility when the update of the multi-dimensional LUT is required. If the originally targeted color reproducibility is selected, the image forming apparatus G forms a color chart, prepares a multi-dimensional LUT, and updates the multi-dimensional LUT, as in the calibration process according to the first embodiment. If the current color reproducibility is selected, the image forming apparatus G forms a mixed-color pattern and updates the reference values of the mixed-color pattern, as in the calibration process according to the second embodiment. In this way, color characteristics that are desired by any user can be achieved.

The update of the multi-dimensional LUT can be determined on the multi-dimensional LUT which is used in color conversion by the color conversion unit 32 of the main body 20 similarly as in the multi-dimensional LUT which is used by the color conversion unit 12 of the controller 10.

A toner image of the mixed-color pattern is formed during primary-color calibration, and the observed values of the toner image are used for determining the update of the multi-dimensional LUT. A mixed-color pattern is formed during the multi-color calibration. The control unit 21 can use the observed values of the mixed-color pattern to determine the update of the multi-dimensional LUT during multi-color calibration.

The formation of a mixed-color pattern and the determination of the update of the multi-dimensional LUT may be carried out at any timing other than the primary-color or multi-color calibration.

Third Embodiment

Figure 10:
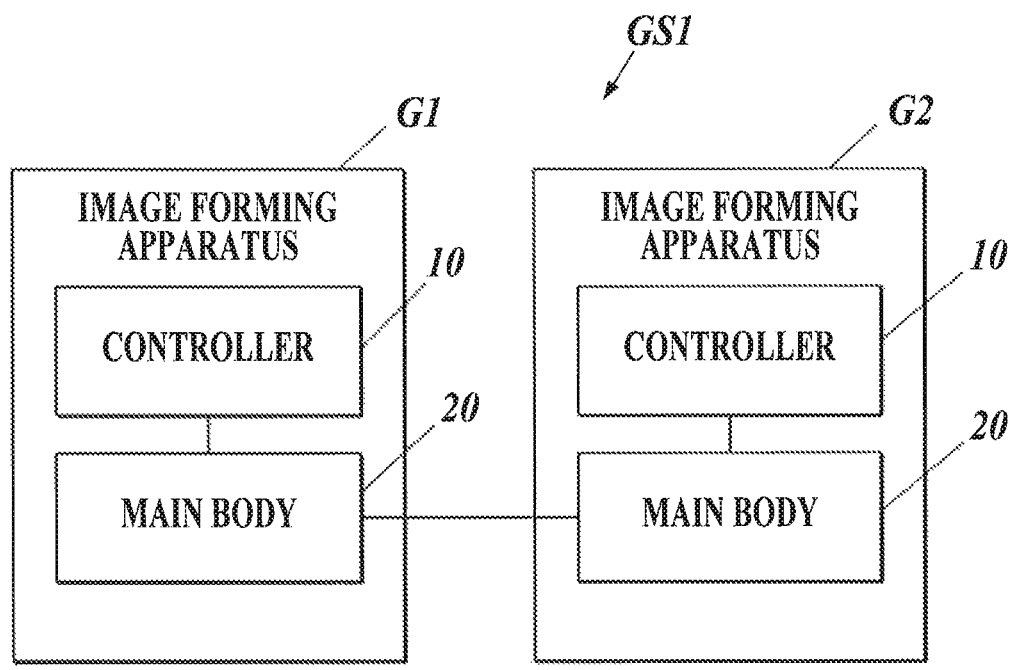
FIG. 10 illustrates an image forming system according to a third embodiment.

FIG. 10 illustrates the configuration of an image forming system GS1 according to a third embodiment.

As illustrated in FIG. 10, the image forming system GS1 is a tandem system including two image forming apparatuses G1 and G2 connected in series. The image forming system GS1 can distribute a job to the image forming apparatuses G1 and G2.

Though the image forming apparatuses G1 and G2 are connected in FIG. 10, the image forming system GS1 may include two or more image forming apparatuses connected in series.

The image forming apparatuses G1 and G2 are connected via an IF such as a USB or a VIF. A job ticket and image data are sent from the image forming apparatus G1 to the subsequent image forming apparatus G2 via the IF and thereby a job can be distributed in units of printing copies or pages.

The sheet conveying paths in the image forming apparatuses G1 and G2 can be connected. The connected sheet conveying paths allow the image forming apparatuses G1 and G2 to share sheets in addition to image data. For example, the image forming apparatus G1 prints an image on the front page of the sheet, and then the image forming apparatus G2 prints an image on the back page of the sheet.

The configurations of the image forming apparatuses G1 and G2 are the same as that of the image forming apparatus G according to the first embodiment. The components of the image forming apparatuses G1 and G2 which are similar to the components of the image forming apparatus G according to the first embodiment are designated by the same reference numerals, and duplicated description is omitted.

As illustrated in FIGS. 1 and 2, the image forming apparatuses G1 and G2 each include a controller 10 and a main body 20.

Figure 11:
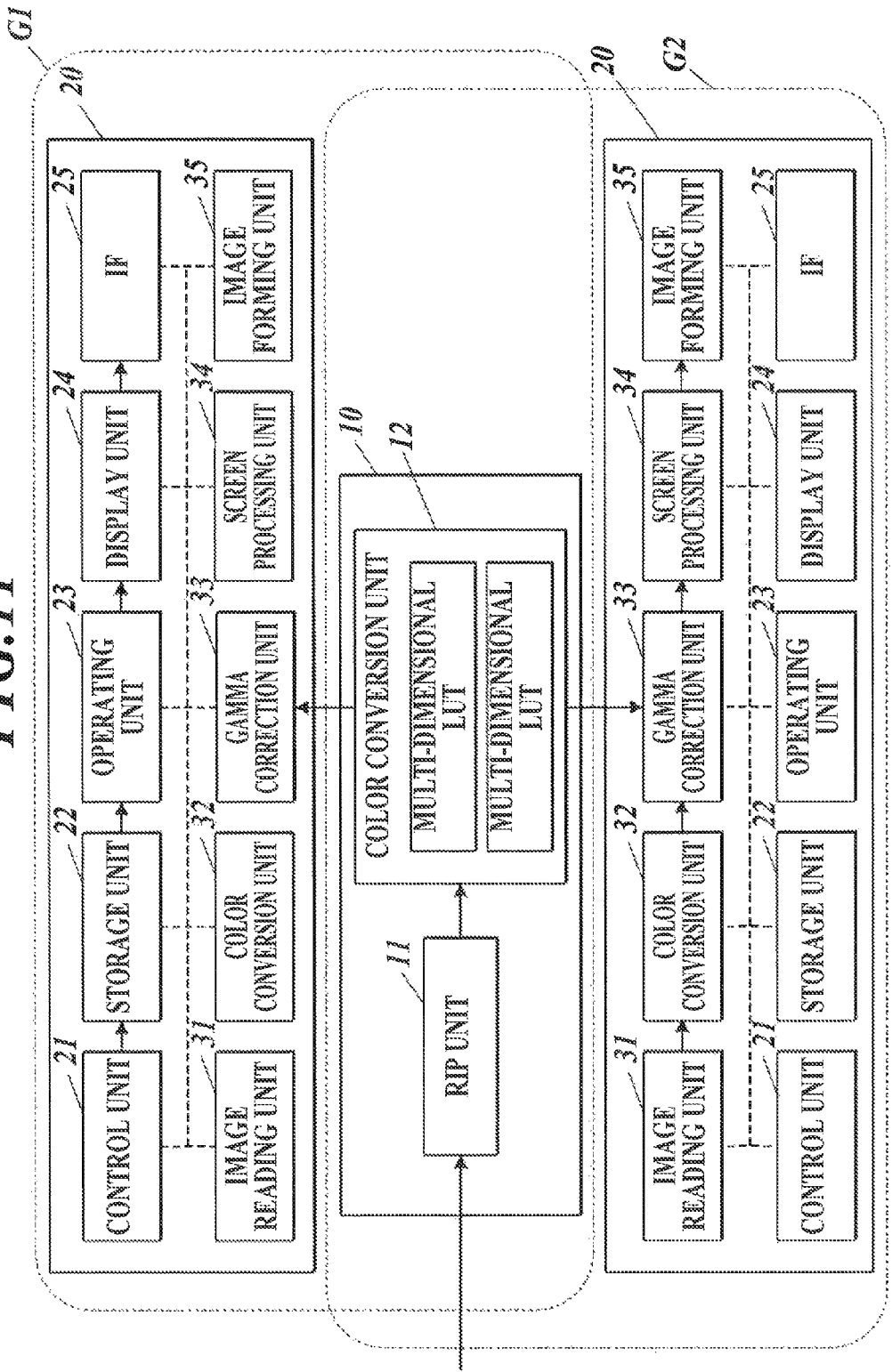
FIG. 11 illustrates an example configuration of image forming apparatuses sharing a single controller.

The controllers 10 of the image forming apparatuses G1 and G2 receive PDL data from an external computer and can carry out jobs independently. Among a plurality of image forming apparatuses G1 and G2, the controller 10 of the image forming apparatus disposed furthest upstream of the conveying path of the sheet may receive the PDL data first and distribute the jobs to the image forming apparatuses G1 and G2. In such a case, the image forming apparatuses G1 and G2 may share a single controller 10, as illustrated in FIG. 11. A color conversion unit 12 of the shared controller 10 has multi-dimensional LUTs corresponding to the printing characteristics of the image forming apparatuses G1 and G2 respectively and transfers the image data which is color-converted on the basis of the multi-dimensional LUTs to the image forming apparatus G1 together with a job ticket.

The image forming apparatus G1 forms an image corresponding to the image data for the image forming apparatus G1 sent from the controller 10. The image forming apparatus G1 transfers image data for the image forming apparatus G2 and the job ticket to the image forming apparatus G2.

The image forming apparatus G2 forms an image corresponding to the image data for the image forming apparatus G2 in accordance with the job ticket from the image forming apparatus G1.

Figure 12:
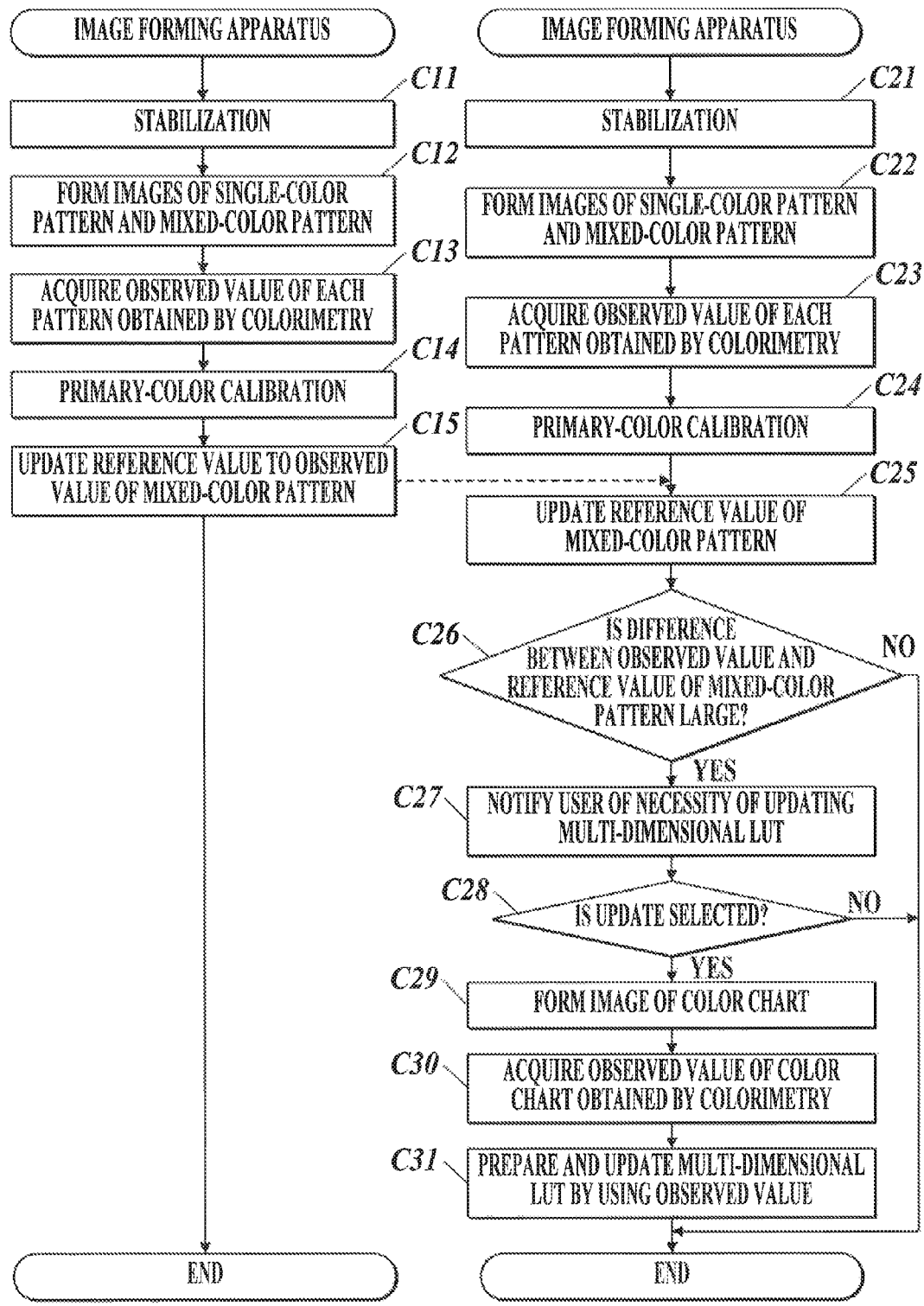
FIG. 12 is a flow chart of calibration carried out by the image forming apparatuses.

FIG. 12 is a flow chart of a calibration carried out by the image forming apparatuses G1 and G2.

As illustrated in FIG. 12, the image forming apparatuses G1 and G2 start with stabilization (Steps C11 and C21).

The stabilization roughly adjusts a variation in density caused by the image forming unit 35 depending on the amount of toner attached to the intermediate transfer belt u7. Highly precise γ correction curves of primary colors can be prepared after establishment of the processing conditions of the image forming unit 35 through the stabilization. Specifically, the image forming unit 35 forms a toner image for adjustment on the intermediate transfer belt u7. Depending on the current processing conditions and the amount of toner attached to the intermediate transfer belt u7 detected by the sensor 4, the control unit 21 establishes the processing conditions of the image forming unit 35 such as the charge potential of the photoconductive drum u3, the exposure of the exposure element u1 and the development potential of the development element u2.

The image forming unit 35 forms a toner image which is screen-processed to have a gradation on the intermediate transfer belt u7. The control unit 21 uses the observed values of the toner image received from the sensor 4 to calculate an engine γ curve corresponding to area gradation by screen processing. The engine γ curve is a γ correction curve obtained under the established processing conditions.

After the stabilization, the control units 21 of the image forming apparatuses G1 and G2 read out, from the respective storage units 22, the single-color patterns used for primary-color calibration and the mixed-color patterns used for multi-color calibration, perform γ correction on these patterns by using the engine γ curve acquired through stabilization, and output γ-corrected patterns to the respective image forming units 35. The image forming units 35 form a toner image of these patterns on a sheet (Steps C12 and C22).

FIG. 4 illustrates an example single-color pattern and an example mixed-color pattern.

The single-color pattern f1 has patches arranged in a gradation of tones for each of the C, M, Y, and K colors.

The mixed-color pattern f2 has patches arranged in a gradation of tones for each mixed color of the R, G, B, and 3C. The mixed color R is a 1:1 mixture of M and Y. The mixed color G is a 1:1 mixture of C and Y. The mixed color B is a 1:1 mixture of C and M. The mixed color 3C is a 1:1:1 mixture of C, M, and Y.

The mixed-color pattern and the single-color pattern are preferably formed on the same sheet for cost reduction. Alternatively, the mixed-color pattern and the single-color pattern may be formed on separate sheets so long as they are formed during the primary-color calibration.

Colorimetry is performed on the different tones of the single-color pattern and the mixed-color pattern formed on the same sheet to acquire the observed values of the patterns by the control units 21 (Steps C13 and C23). The colorimetric values of the single-color pattern can be used for the primary-color calibration, and the colorimetric values of the mixed-color pattern can be used for the multi-color calibration.

Any colorimetric method can be employed. For example, an operator may use a colorimeter to measure L*a*b* values and input the measured L*a*b* values by using the operating units 23 to the control units 21. The colorimeter and the image forming apparatuses G1 and G2 may be connected via the IFs 25 so that the control units 21 directly receive the values from the colorimeter. The colorimetry may be performed with the image reading units 31 in place of the colorimeter. An operator may use the image reading units 31 to read the mixed-color pattern printed on a sheet and end the corresponding RGB values outputted from the image reading units 31 to the respective control units 21. The RGB values may be measured by using an optical sensor or a similar device that is disposed in the conveying path of the sheet.

The control units 21 use the observed values of the single-color pattern for primary-color calibration (Steps C14 and C24). The control units 21 perform primary-color calibration to calculate the γ correction curve using the observed values of the single-color pattern and update a γ correction curve that is used by the gamma correction units 33 for γ correction to the calculated γ correction curve.

FIG. 5 illustrates an example γ correction curve.

In FIG. 5, a reproduced gradation curve H1 plots the observed values of the single-color pattern and represents the gradation characteristics of the current color reproducibility. A target gradation curve H2 represents the target gradation characteristics with an input value to output value ratio of 1:1. The control units 21 acquire a γ correction curve H3 which represents the inverse of the reproduced gradation curve H1 with respect to the target gradation curve H2.

After primary calibration, the control unit 21 of the image forming apparatus G1 updates reference values for the tones of the mixed colors in the mixed-color pattern stored in the corresponding storage unit 22 to the observed values as new reference values (Step C15). The control unit 21 of the image forming apparatus G1 sends the updated reference values of the mixed-color pattern to the image forming apparatus G2. Then, the image forming apparatus G1 ends the process and enters a stand-by mode.

The image forming apparatus G2 carries out the following process on the basis of the reference values of the mixed-pattern sent from the image forming apparatus G1. The control unit 21 of the image forming apparatus G2 updates reference values for the tones of the mixed colors in the mixed-color pattern stored in the storage unit 22 to the reference values sent from the image forming apparatus G1 (Step C25).

The control unit 21 of the image forming apparatus G2 determines the difference between the observed values of the tones of the mixed-color pattern and the reference values of the mixed-color pattern on the basis of a threshold value (Step C26).

That is, the control unit 21 compares the difference in the color values representing color shades of mixed colors between the observed values and reference values with a threshold value. For example, when observed values are RGB values, the control unit 21 converts the RGB color space into a YCrCb color space. Y is a color value representing brightness, and Cr and Cb are color values representing color shades.

FIG. 6 illustrates graphs T11 and T12 plotting the color values Cr and Cb of the mixed color 3C versus the brightness Y. The reference color values Cr and Cb are plotted in graph T11, and the observed color values Cr and Cb are plotted in graph T12.

The control unit 21 extracts reference color values Cr11, Cr12, and Cr13 and observed color values Cr21, Cr22, and Cr23, which respectively correspond to arbitrary values of brightness Y1, Y2, and Y3. If a reference or observed color value Cr corresponding to brightness Y1, Y2, and Y3 does not exist, the control unit 21 acquires an interpolated color value Cr by linearly-interpolating the reference color values or the observed color values. The control unit 21 compares the average of the differences between the color values Cr11 and Cr21, between the color values Cr12 and Cr22 and between the color values Cr13 and Cr23 with a threshold value. The control unit 21 determines that the color shades represented by the observed values have shifted greatly from the color shades represented by the reference values if the average is larger than or equal to the threshold value. The control unit 21 determines that the color shades represented by the observed values are the same to or in an acceptable difference with the color shades represented by the reference values if the average is smaller than the threshold value.

Three color values are extracted and used for comparison. However, the number of color values to be extracted is not limited. Comparison with a large number of color values achieves accurate determination.

The control unit 21 may compare the difference in the areas of the characteristic curves between reference color values Cr and Cb and observed color values Cr and Cb, for example, to determine the difference between the color values with a threshold value.

The control unit 21 preferably determines a coefficient of correlation of observed color values and reference color values, compares the coefficient of correlation with a threshold value, and determines the difference between the color values. The use of the coefficient of correlation enables accurate determination of a shift in the color shades represented by the observed color values from the color shades represented by the reference color values.

The coefficient of correlation is a statistical value representing the similarity between two variables and is determined by dividing the covariance values of the two variables by their respective standard deviations. The coefficient of correlation is a real number within the range of −1 to 1. A coefficient of correlation approximating 1 or −1 indicates that the observed color values Cr and Cb and the reference color values Cr and Cb are similar, whereas a coefficient of correlation approximating zero indicates that the observed color values Cr and Cb and the reference color values Cr and Cb are different. Thus, when a threshold value is represented by Th (Th is a positive value smaller than one), the control unit 21 determines that the difference between the observed color values and the reference color values is larger if the coefficient of correlation is within a range of −Th to Th. In contrast, the control unit 21 determines that the difference between the observed color values and the reference color values is small if the coefficient of correlation is larger than or equal to −1 and smaller than −Th or larger than Th and smaller than or equal to 1.

FIGS. 7 and 8 are graphs plotting the reference color values Cr and Cb and the observed color values Cr and Cb, which are shown in FIG. 6, versus brightness Y. The x-axis represents the reference color values, and the y-axis represents the observed color values.

The graph in FIG. 7 represents a profile of the color values Cr and Cb having a small difference between the observed values and the reference values and having a coefficient of correlation approximating 1 or −1.

The graph in FIG. 8 represents a profile of the color values Cr and Cb having a large difference between the observed values and the reference values and having a coefficient of correlation approximating zero.

The control unit 21 can also determine the mean square error between the observed color values and the reference color values and compare the determined mean square error with a threshold value. The control unit 21 determines that the difference between the reference color values and the observed color values is large if the mean square error is larger than or equal to the threshold value and determines that the difference between the reference color values and the observed color values is small if the mean square error is smaller than the threshold value. Similar to the coefficient of correlation, the mean square error can also be used to accurately determine the shift of color shades represented by the observed color values from the reference color values.

Values in an observed L*a*b* color space include brightness L and color values a* and b* representing color shades. Similar to the color values Cr and Cb, the control unit 21 compares the shift of the observed color values a* and b* from the reference color values a* and b* on the basis of a threshold value.

If the control unit 21 determines that the difference is not large on the basis of the threshold value (N in Step C26), a shift from the reference value is not observed or within an acceptable range, in other words, the color reproducibility is substantially the same as the color reproducibility of the image forming apparatus G1 which is the reference, and the update of the multi-dimensional LUT is not required. Then, the image forming apparatus G2 ends the process and enters a stand-by mode.

If the control unit 21 determines that the difference is large on the basis of the threshold value (Y in Step C26), the shift of the color shades from the reference values is large, in other words, the color reproducibility differs greatly from the color reproducibility of the image forming apparatus G1 which is the reference, and the update of the multi-dimensional LUT is required.

Before the update of the multi-dimensional LUT, the control unit 21 notifies the user of the necessity of updating the multi-dimensional LUT (Step C27). It is preferable to notify the user of the update of the multi-dimensional LUT in advance because the update of the multi-dimensional LUT requires time and the image forming apparatus G2 cannot be used during the update of the multi-dimensional LUT. Any method of notification may be used to allow a user to select the update. For example, the control unit 21 instructs the display unit 24 to display a notification of the update of the multi-dimensional LUT and a menu that allows the user to select the update.

If the user does not select the update (N in Step C28), the image forming apparatus G2 ends the process and enters a stand-by mode.

If the user selects the update (Y in Step C28), the control unit 21 reads out the color chart to be used for the update of the multi-dimensional LUT from the storage unit 22 and sends the color chart to the gamma correction unit 33. The gamma correction unit 33 performs γ-correction on the color chart and sends the γ-corrected color chart to the image forming unit 35. The image forming unit 35 forms a toner image of the color chart on a sheet (Step C29).

Similar to the single-color pattern, the control unit 21 acquires colorimetric values of the toner image of the color chart on the sheet (Step C30). The control unit 21 prepares a multi-dimensional LUT by using the acquired colorimetric values and rewrites or updates a multi-dimensional LUT used by the color conversion unit 12 to the newly prepared multi-dimensional LUT (Step C31).

During preparation of the multi-dimensional LUT, the control unit 21 calculates the input values and output values of the grid points in the multi-dimensional LUT on the basis of the relationship between the CMYK tonal values of each of the patches in the color chart and the respective observed tonal values. If the CMYK tonal values and the observed tonal values do not directly correspond to the grid points, the control unit 21 interpolates the CMYK tonal values and the observed tonal values to calculate the input values and output values for the grid points.

Any known method of preparing the multi-dimensional LUT can be used; for example, those disclosed in Japanese Patent Application Laid-Open Nos. 2004-120483 and 2000-196905.

As described above, according to the third embodiment, the image forming system GS1 includes a plurality of image forming apparatuses which are connected in series including a first image forming apparatus G1 serving as a reference and a second image forming apparatus G2 not serving as a reference. Each of the image forming apparatuses includes an image forming unit 35 which forms an image on a sheet by using color materials of a plurality of colors on the basis of image data; a color conversion unit 12 which converts a color space of the image data to a color space of the color materials used by the image forming unit by using a multi-dimensional LUT; a storage unit 22 which stores a mixed-color pattern including a gradation of tones of a mixed color and a reference value of each of the tones, the mixed color made of at least two colors among the plurality of colors; and a control unit 21 which updates the multi-dimensional LUT. Each of the image forming apparatuses G1 and G2 forms an image of the mixed-color pattern on the sheet, and the second image forming apparatus G2 compares color values representing color shades for each of the tones between an observed value of the mixed-color pattern provided by the first image forming apparatus G1, which is a reference value, and an observed value of the mixed-color pattern provided by the second image forming apparatus G2, and determines that the multi-dimensional LUT of the second image forming apparatus G2 needs to be updated and updates the multi-dimensional LUT if the difference of the color values is determined to be large on the basis of a threshold value.

Thus, a large variation in color reproducibility that requires the update of a multi-dimensional LUT of a plurality of image forming apparatuses G1 and G2 can be readily determined by using mixed-color patterns that can be readily calorimetrically measured, without preparation of a color chart containing an extremely large number of mixed colors and tones. A comparison of color values representing color shades of a mixed color between reference values and observed values in a mixed-color pattern leads to objective determination of a larger shift of the color reproducibility in the image forming apparatus G2 from the targeted color reproducibility of the image forming apparatus G1. Thus, necessity of updating the multi-dimensional LUT can be determined readily and appropriately.

Further, according to the third embodiment, a common multi-dimensional LUT can be established for the image forming apparatus G1 and G2. Hence, the same color reproducibility can be achieved for every image forming apparatus.

The control unit 21 of each of the image forming apparatuses G2 carries out primary-color calibration by using a single-color pattern including a gradation of tones, forms the mixed-color pattern by the image forming unit 35 during the primary-color calibration and compares the observed value of the mixed-color pattern with the reference value.

Thus, necessity of updating the multi-dimensional LUT can be determined during the primary-color calibration, without colorimetry of the color chart or the completion of the primary-color calibration.

In the calibration illustrated in FIG. 12, the primary-color calibration is carried out before Step C26 of determining the update of the multi-dimensional LUT. However, the primary-color calibration may be carried out after Step C26 so long as the primary-color calibration is performed before the update of the multi-dimensional LUT.

The present invention is not limited to the third embodiment, which can be modified into various forms within the scope of the invention.

For example, the update of the multi-dimensional LUT of the image forming apparatus G2 is determined on the basis of the color reproducibility of the image forming apparatus G1 serving as a reference. Alternatively, the image forming apparatuses G1 and G2 may determine the update of the respective multi-dimensional LUTs on the basis of an imaginary image forming apparatus which serves as a reference and has average color reproducibility of the image forming apparatuses G1 and G2 to update the multi-dimensional LUTs. The color reproducibility of the image forming apparatuses G1 and G2 may be updated to the average color reproducibility of the image forming apparatuses G1 and G2. Specifically, the image forming apparatus G1 acquires observed values of the mixed-color pattern formed by the image forming apparatus G2 and sends the average observed values of the image forming apparatuses G1 and G2 as reference values to the image forming apparatus G2. The image forming apparatuses G1 and G2 determine the difference between the reference values which are their average values and the observed values, and update the multi-dimensional LUTs if the difference is large.

Necessity of the update can be determined on the multi-dimensional LUT used in color conversion by the color conversion unit 32 of the main body 20 similarly as in the case of updating the multi-dimensional LUT used by the color conversion unit 12 of the controller 10.

A toner image of the mixed-color pattern is formed during primary-color calibration, and the observed values of the toner image are used for determining the update of the multi-dimensional LUT. A mixed-color pattern is formed during multi-color calibration. Thus, the control unit 21 can determine the update of the multi-dimensional LUT by using the observed values of the mixed-color pattern.

The formation of a mixed-color pattern and the determination of the update of the multi-dimensional LUT may be carried out at any timing other than primary-color or multi-color calibration.

Fourth Embodiment

Figure 13:
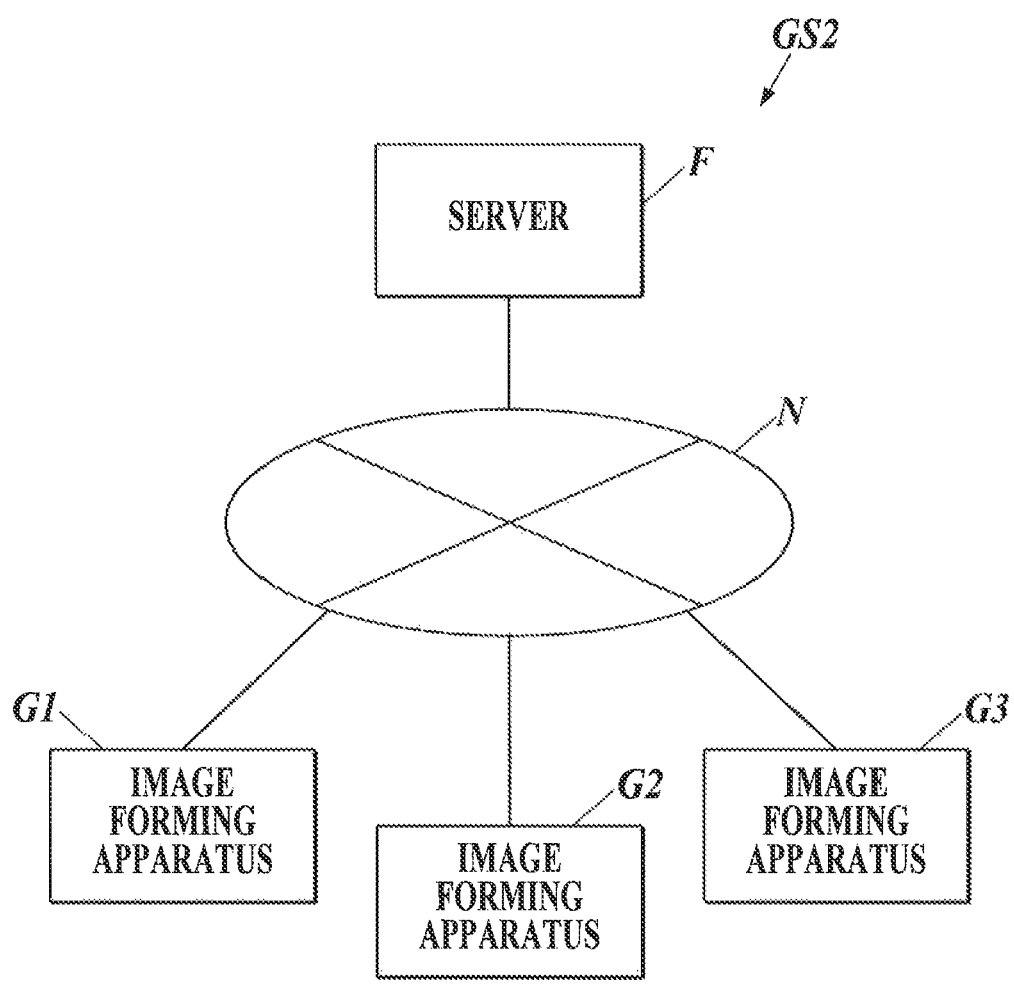
FIG. 13 illustrates an image forming system according to a fourth embodiment.

FIG. 13 illustrates the configuration of an image forming system GS2 according to the fourth embodiment of the present invention.

As illustrated in FIG. 13, the image forming system GS2 includes a server F and three image forming apparatuses G1 to G3 and can distribute a printing job among the image forming apparatuses G1 to G3. The server F and the image forming apparatuses G1 to G3 are connected via a network N, such as a LAN. The server F distributes the job to the image forming apparatuses G1 to G3.

The server F receives PDL data from an external computer and sends the PDL data to the image forming apparatuses G1 to G3.

The server F includes a control unit including a CPU, RAM and other devices, and a storage unit such as a hard disk.

The server F stores reference values of the tones of mixed colors in a mixed-color pattern and sends these values to the image forming apparatuses G1 to G3.

The configurations of each of the image forming apparatuses G1 to G3 are the same as the components of the image forming apparatus G according to the first embodiment. The components of the image forming apparatuses G1 to G3, which are similar to the components of the image forming apparatus G according to the first embodiment, are designated by the same reference numerals, and duplicated description is omitted.

As illustrated in FIGS. 1 and 2, the image forming apparatuses G1 to G3 each include a controller 10 and a main body 20.

Figure 14:
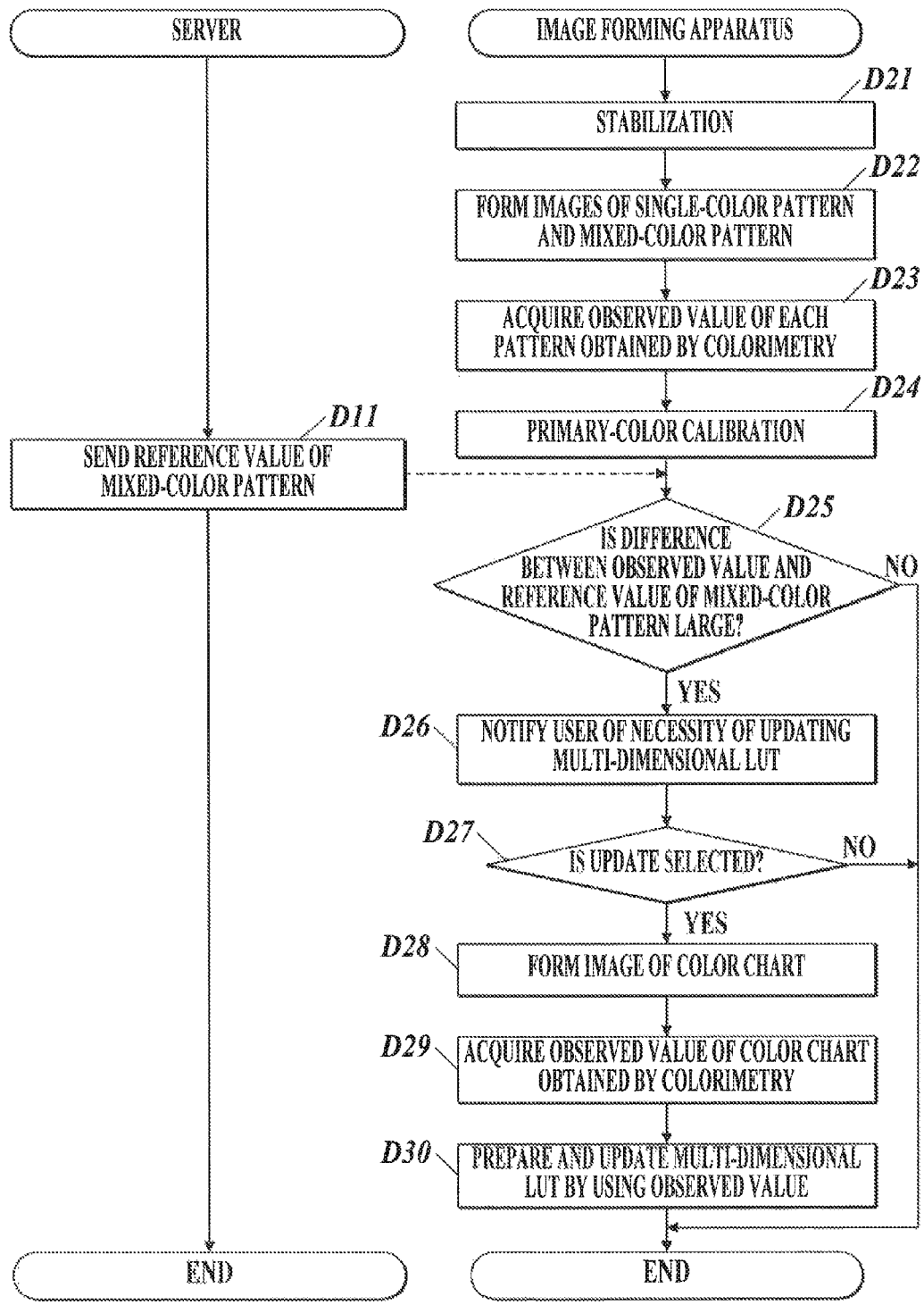
FIG. 14 is a flow chart of calibration carried out by image forming apparatuses.

FIG. 14 is a flow chart of the calibration carried out by the server F and the image forming apparatuses G1 to G3.

As illustrated in FIG. 14, the server F sends reference values of the tones of mixed colors in a mixed-color pattern to the image forming apparatuses G1 to G3 (Step D11).

Each of the image forming apparatuses G1 to G3 updates reference values of the tones of mixed colors in the mixed-color pattern stored in a storage unit 22 to the reference values sent from the server F.

The server F sends reference values of the mixed-color pattern set in advance or otherwise may acquire the colorimetric values of the mixed-color pattern formed by each of the image forming apparatuses G1 to G3 and sends the average value of the colorimetric values as a reference value to the image forming apparatuses G1 to G3. The color reproducibility of the image forming apparatuses G1 to G3 may be updated to the average color reproducibility of the image forming apparatuses G1 to G3. The server F may also send colorimetric values of the mixed-color pattern of one of the image forming apparatuses G1 to G3 as a reference value to the image forming apparatuses G1 to G3. The color reproducibility of the image forming apparatuses G1 to G3 may be updated to the color reproducibility of one of the image forming apparatuses G1 to G3.

Each of the image forming apparatuses G1 to G3 starts with stabilization (Step D21).

The stabilization roughly adjusts a variation in density caused by the image forming unit 35 depending on the amount of toner attached to the intermediate transfer belt u7. Highly precise γ correction curves of primary colors can be prepared after establishment of the processing conditions of the image forming unit 35 through the stabilization. Specifically, the image forming unit 35 forms a toner image for adjustment on the intermediate transfer belt u7. Depending on the current processing conditions and the amount of toner attached to the intermediate transfer belt u7 detected by the sensor 4, the control unit 21 establishes the processing conditions of the image forming unit 35 such as the charge potential of the photoconductive drum u3, the exposure of the exposure element u1 and the development potential of the development element u2.

The image forming unit 35 forms a toner image which is screen-processed to have a gradation on the intermediate transfer belt u7. The control unit 21 uses the observed values of the toner image received from the sensor 4 to calculate an engine γ curve corresponding to area gradation by screen processing. The engine γ curve is a γ correction curve obtained under the established processing conditions.

After the stabilization, the control unit 21 reads out, from the storage unit 22, the single-color patterns used for primary-color calibration and the mixed-color patterns used for multi-color calibration, performs γ correction on these patterns by using the engine γ curve acquired through the stabilization, and outputs the γ-corrected patterns to the image forming unit 35. The image forming unit 35 forms a toner image of these patterns on a sheet (Step D22).

FIG. 4 illustrates an example single-color pattern and an example mixed-color pattern.

The single-color pattern f1 has patches arranged in a gradation of tones for each of the C, M, Y, and K colors.

The mixed-color pattern f2 has patches arranged in a gradation of tones for each mixed color of the R, G, B, and 3C. The mixed color R is a 1:1 mixture of M and Y. The mixed color G is a 1:1 mixture of C and Y. The mixed color B is a 1:1 mixture of C and M. The mixed color 3C is a 1:1:1 mixture of C, M, and Y.

The mixed-color pattern and the single-color pattern are preferably formed on the same sheet for cost reduction. Alternatively, the mixed-color pattern and the single-color pattern may be formed on separate sheets so long as they are formed during the primary-color calibration.

Colorimetry is performed on the different tones of the single-color pattern and the mixed-color pattern formed on the same sheet to acquire the observed values of the patterns by the control unit 21 (Step D23). The colorimetric values of the single-color pattern can be used for the primary-color calibration, and the colorimetric values of the mixed-color pattern can be used for the multi-color calibration.

Any colorimetric method can be employed. For example, an operator may use a colorimeter to measure L*a*b* values and input the measured L*a*b* values by using the operating unit 23 to the control unit 21. The colorimeter and the image forming apparatuses G1 to G3 may be connected via the IF 25 so that each of the control units 21 directly receives the values from the colorimeter. The colorimetry may be performed with the image reading unit 31 in place of the colorimeter. An operator may use the image reading unit 31 to read the mixed-color pattern printed on a sheet and send the corresponding RGB values outputted from the image reading unit 31 to the control unit 21. The RGB values may be measured by using an optical sensor or a similar device that is disposed in the conveying path of the sheet.

The control unit 21 uses the observed values of the single-color pattern for primary-color calibration (Step D24). The control unit 21 performs primary-color calibration to calculate the γ correction curve by using the observed values of the single-color pattern and updates a γ correction curve used by the gamma correction unit 33 for γ correction to the calculated γ correction curve.

FIG. 5 illustrates an example γ correction curve.

In FIG. 5, a reproduced gradation curve H1 plots the observed values of the single-color pattern and represents the gradation characteristics of the current color reproducibility. A target gradation curve H2 represents the target gradation characteristics with an input value to output value ratio of 1:1. The control unit 21 acquires a γ correction curve H3, which represents the inverse of the reproduced gradation curve H1 with respect to the target gradation curve H2.

The control unit 21 determines the difference between the observed values of the tones of the mixed-color pattern and the reference values of the mixed-color pattern on the basis of a threshold value (Step D25).

That is, the control unit 21 compares the difference in color values representing color shades of mixed colors between observed values and reference values with a threshold value. For example, when the observed values are RGB values, the control unit 21 converts the RGB color space into a YCrCb color space. Y is a color value representing brightness, and Cr and Cb are color values representing color shades.

FIG. 6 illustrates graphs T11 and T12 plotting the color values Cr and Cb of the mixed color 3C versus the brightness Y. The reference color values Cr and Cb are plotted in graph T11, and the observed color values Cr and Cb are plotted in graph T12.

The control unit 21 extracts reference color values Cr11, Cr12, and Cr13 and observed color values Cr21, Cr22, and Cr23, which respectively correspond to arbitrary values of brightness Y1, Y2, and Y3. If a reference or observed color value Cr corresponding to brightness Y1, Y2, and Y3 does not exist, the control unit 21 acquires an interpolated color value Cr by linearly-interpolating the reference color values or the observed color values. The control unit 21 compares the average of the differences between the color values Cr11 and Cr21, between the color values Cr12 and Cr22 and between the color values Cr13 and Cr23 with a threshold value. The control unit 21 determines that the color shades represented by the observed values have shifted greatly from the color shades represented by the reference values if the average is larger than or equal to the threshold value. The control unit 21 determines that the color shades represented by the observed values are the same to or in an acceptable difference with the color shades represented by the reference values if the average is smaller than the threshold value.

Three color values are extracted and used for comparison. However, the number of color values to be extracted is not limited. Comparison with a large number of color values achieves accurate determination.

The control unit 21 may compare the difference in the areas of the characteristic curves between reference color values Cr and Cb and observed color values Cr and Cb, for example, to determine the difference between the color values with a threshold value.

The control unit 21 preferably determines a coefficient of correlation of observed color values and reference color values, compares the coefficient of correlation with a threshold value, and determines the difference between the color values. The use of the coefficient of correlation enables accurate determination of a shift of the color shades represented by the observed color values from the color shades represented by the reference color values.

The coefficient of correlation is a statistical value representing the similarity between two variables and is determined by dividing the covariance values of the two variables by their respective standard deviations. The coefficient of correlation is a real number within the range of $-1$ to $1$. A coefficient of correlation approximating $1$ or $-1$ indicates that the observed color values Cr and Cb and the reference color values Cr and Cb are similar, whereas a coefficient of correlation approximating zero indicates that the observed color values Cr and Cb and the reference color values Cr and Cb are different. Thus, when a threshold value is represented by Th (Th is a positive value smaller than one), the control unit 21 determines that the difference between the observed color values and the reference color values is larger if the coefficient of correlation is within a range of $-Th$ to $Th$. In contrast, the control unit 21 determines that the difference between the observed color values and the reference color values is small if the coefficient of correlation is larger than or equal to $-1$ and smaller than $-Th$ or larger than $Th$ and smaller than or equal to $1$.

FIGS. 7 and 8 are graphs plotting the reference color values Cr and Cb and the observed color values Cr and Cb, which are shown in FIG. 6, versus brightness Y. The x-axis represents the reference color values, and the y-axis represents the observed color values.

The graph in FIG. 7 represents a profile of the color values Cr and Cb having a small difference between the observed values and the reference values and having a coefficient of correlation approximating 1 or $-1$.

The graph in FIG. 8 represents a profile of the color values Cr and Cb having a large difference between the observed values and the reference values and having a coefficient of correlation approximating zero.

The control unit 21 can also determine the mean square error between the observed color values and the reference color values and compare the determined mean square error with a threshold value. The control unit 21 determines that the difference between the reference color values and the observed color values is large if the mean square error is larger than or equal to the threshold value and determines that the difference between the reference color values and the observed color values is small if the mean square error is smaller than the threshold value. Similar to the coefficient of correlation, the mean square error can also be used to accurately determine the shift of color shades represented by the observed color values from the reference color values.

Values in an observed L*a*b* color space include brightness L and color values a* and b* representing color shades. Similar to the color values Cr and Cb, the control unit 21 compares the shift of the observed color values a* and b* from the reference color values a* and b* with a threshold value.

If the difference is not determined to be large on the basis of the threshold value (N in Step D25), a shift from the reference value is not observed or within an acceptable range, and thus the control unit 21 determines that the update of the multi-dimensional LUT is not required. Then, the image forming apparatuses G1 to G3 ends the process and enters a stand-by mode.

If the difference is determined to be large on the basis of the threshold value (Y in Step D25), the shift of the color shades from the reference values is large, and thus the control unit 21 determines that the update of the multi-dimensional LUT is required.

Before updating the multi-dimensional LUT, the control unit 21 notifies the user of the necessity of updating the multi-dimensional LUT (Step D26). It is preferable to notify the user of the necessity of updating the multi-dimensional LUT in advance because the update of the multi-dimensional LUT requires time and each of the image forming apparatuses G1 to G3 cannot be used during the update of the multi-dimensional LUT. Any method of notification may be used to allow a user to select the update. For example, the control unit 21 instructs the display unit 24 to display a notification of the necessity of updating the multi-dimensional LUT and a menu that allows the user to select the update.

If the user does not select the update (N in Step D27), the control unit 21 ends the process and enters a stand-by mode.

If the user selects the update (Y in Step D27), the control unit 21 reads out the color chart to be used for the update of the multi-dimensional LUT from the storage unit 22 and sends the color chart to the gamma correction unit 33. The gamma correction unit 33 performs γ-correction on the color chart and sends the γ-corrected color chart to the image forming unit 35. The image forming unit 35 forms a toner image of the color chart on a sheet (Step D28).

Similar to the single-color pattern, the control unit 21 acquires colorimetric values of the toner image of the color chart on the sheet (Step D29). The control unit 21 prepares a multi-dimensional LUT by using the acquired colorimetric values and rewrites or updates a multi-dimensional LUT used by the color conversion unit 12 to the newly prepared multi-dimensional LUT (Step D30).

During preparation of the multi-dimensional LUT, the control unit 21 calculates the input values and output values of the grid points in the multi-dimensional LUT on the basis of the relationship between the CMYK tonal values of the patches in the color chart and the respective observed tonal values. If the CMYK tonal values and the observed tonal values do not directly correspond to the grid points, the control unit 21 interpolates the CMYK tonal values and the observed tonal values to calculate the input values and output values for the grid points.

Any known method of preparing the multi-dimensional LUT can be used; for example, those disclosed in Japanese Patent Application Laid-Open Nos. 2004-120483 and 2000-196905.

As described above, according to the fourth embodiment, the image forming system GS2 includes a plurality of image forming apparatuses G1 to G3 connected via a network, and each of the image forming apparatuses G1 to G3 includes an image forming unit 35 which forms an image on a sheet by using color materials of a plurality of colors on the basis of image data; a color conversion unit 12 which converts a color space of the image data to a color space of the color materials used by the image forming unit by using a multi-dimensional LUT; a storage unit 22 which stores a mixed-color pattern including a gradation of tones of a mixed color and a reference value of each of the tones, the mixed color made of at least two colors among the plurality of colors; and a control unit 21 which updates the multi-dimensional LUT. Each of the image forming apparatuses G1 to G3 forms an image of the mixed-color pattern on the sheet, compares color values representing color shades for each of the tones between an observed value of the image of the mixed-color pattern formed on the sheet and the reference value of the mixed-color pattern stored in the storage unit 22, and determines that the multi-dimensional LUT needs to be updated and updates the multi-dimensional LUT if the difference of the color values is determined to be large on the basis of a threshold value.

Thus, a large variation in color reproducibility that requires the update of a multi-dimensional LUT can be readily determined by using mixed-color patterns that can be readily calorimetrically measured, without preparation of a color chart containing an extremely large number of mixed colors and tones. A comparison of color values representing color shades of a mixed color between reference values and observed values in a mixed-color pattern leads to objective determination of a larger shift of the color reproducibility from the targeted color reproducibility for each of the image forming apparatuses G1 to G3. Thus, necessity of updating the multi-dimensional LUT can be determined readily and appropriately.

Further, according to the fourth embodiment, the image forming apparatuses G1 to G3 may have the same color profile. In this way, the same color reproducibility can be provided by all the image forming apparatuses.

Each of the image forming apparatuses G1 to G3 carries out primary-color calibration by using a single-color pattern including a gradation of tones, forms the mixed-color pattern during the primary-color calibration and compares the observed values of the mixed-color pattern with the reference values.

Thus, necessity of updating the multi-dimensional LUT can be determined during the primary-color calibration, without colorimetry of the color chart or the completion of the primary-color calibration.

In the calibration illustrated in FIG. 14, the primary-color calibration is carried out before Step D25 of determining the update of the multi-dimensional LUT. However, the primary-color calibration may be carried out after Step D25 so long as the primary-color calibration is performed before the update of the multi-dimensional LUT.

The present invention is not limited to the fourth embodiment, which can be modified into various forms within the scope of the invention.

For example, the necessity of the update can also be determined on the multi-dimensional LUT used in color conversion by the color conversion unit 32 of the main body 20 similarly as in the case of updating the multi-dimensional LUT used by the color conversion unit 12 of the controller 10.

A toner image of the mixed-color pattern is formed during primary-color calibration, and the observed values of the toner image are used for determining the update of the multi-dimensional LUT. A mixed-color pattern is formed during the multi-color calibration. The control unit 21 can use the mixed-color pattern to determine the update of the multi-dimensional LUT during multi-color calibration.

The formation of a mixed-color pattern and the determination of the update of the multi-dimensional LUT may be carried out at any timing other than the primary-color or multi-color calibration.

According to the first aspect of a preferred embodiment of the present invention, there is provided an image forming apparatus including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which forms an image of the mixed-color pattern on the sheet with the image forming unit, compares color values representing color shades for each of the tones between an observed value of the image of the mixed-color pattern formed on the sheet and the reference value of the mixed-color pattern stored in the storage unit, and determines that the multi-dimensional LUT needs to be updated and updates the multi-dimensional LUT if a difference of the color values is determined to be large on the basis of a threshold value.

Preferably, the control unit carries out primary-color calibration by using a single-color pattern including a gradation of tones, forms the image of the mixed-color pattern with the image forming unit during the primary-color calibration and compares the observed value with the reference value.

Preferably, the control unit carries out multi-color calibration by using the mixed-color pattern and compares the observed value of the image of the mixed-color pattern which is formed during the multi-color calibration with the reference value.

Preferably, the colors of the color materials include cyan (C), magenta (M), yellow (Y), and black (K), the mixed-color pattern includes the gradation of tones for each of the mixed colors R, G, B, and 3C, the mixed color R is a 1:1 mixture of M and Y, the mixed color G is a 1:1 mixture of C and Y, the mixed color B is a 1:1 mixture of C and M, and the mixed color 3C is a 1:1:1 mixture of C, M, and Y.

Preferably, the control unit notifies necessity of updating the multi-dimensional LUT before updating the multi-dimensional LUT.

According to the second aspect of a preferred embodiment of the present invention, there is provided an image forming apparatus including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which forms an image of the mixed-color pattern on the sheet with the image forming unit, compares color values representing color shades for each of the tones between an observed value of the image of the mixed-color pattern formed on the sheet and the reference value of the mixed-color pattern stored in the storage unit, and updates the reference value of the mixed-color pattern stored in the storage unit to the observed value for each of the tones and maintains the current multi-dimensional LUT if the difference of the color values is determined to be large on the basis of a threshold value.

Preferably, the control unit carries out primary-color calibration by using a single-color pattern including a gradation of tones, forms the image of the mixed-color pattern with the image forming unit during the primary-color calibration and compares the observed value with the reference value.

Preferably, the control unit carries out multi-color calibration by using the mixed-color pattern and compares the observed value of the image of the mixed-color pattern which is formed during the multi-color calibration with the reference value.

Preferably, the colors of the color materials include cyan (C), magenta (M), yellow (Y), and black (K), the mixed-color pattern includes the gradation of tones for each of the mixed colors R, G, B, and 3C, the mixed color R is a 1:1 mixture of M and Y, the mixed color G is a 1:1 mixture of C and Y, the mixed color B is a 1:1 mixture of C and M, and the mixed color 3C is a 1:1:1 mixture of C, M, and Y.

According to the third aspect of a preferred embodiment of the present invention, there is provided an image forming system including a plurality of image forming apparatuses which are connected in series including a first image forming apparatus serving as a reference and a second image forming apparatus not serving as a reference, each of the image forming apparatuses including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which updates the multi-dimensional LUT, wherein, each of the image forming apparatuses forms an image of the mixed-color pattern on the sheet, and the second image forming apparatus compares color values representing color shades for each of the tones between an observed value of the mixed-color pattern provided by the first image forming apparatus, which is a reference value, and an observed value of the mixed-color pattern provided by the second image forming apparatus, and determines that the multi-dimensional LUT of the second image forming apparatus needs to be updated and updates the multi-dimensional LUT if the difference of the color values is determined to be large on the basis of a threshold value.

Preferably, each of the image forming apparatuses carries out primary-color calibration by using a single-color pattern including a gradation of tones, forms the image of the mixed-color pattern during the primary-color calibration and compares the observed value with the reference value.

Preferably, each of the image forming apparatuses carries out multi-color calibration by using the mixed-color pattern and compares the observed value of the image of the mixed-color pattern formed during the multi-color calibration with the reference value.

Preferably, the colors of the color materials include cyan (C), magenta (M), yellow (Y), and black (K), the mixed-color pattern includes the gradation of tones for each of the mixed colors R, G, B, and 3C, the mixed color R is a 1:1 mixture of M and Y, the mixed color G is a 1:1 mixture of C and Y, the mixed color B is a 1:1 mixture of C and M, and the mixed color 3C is a 1:1:1 mixture of C, M, and Y.

Preferably, each of the image forming apparatuses notifies necessity of updating the multi-dimensional LUT before updating the multi-dimensional LUT.

According to the fourth aspect of a preferred embodiment of the present invention, there is provided an image forming system including a plurality of image forming apparatuses connected via a network, each of the image forming apparatuses including an image forming unit which forms an image on a sheet by using color materials of a plurality of colors on the basis of image data; a color conversion unit which converts a color space of the image data to a color space of the color materials used by the image forming unit by using a multi-dimensional LUT; a storage unit which stores a mixed-color pattern including a gradation of tones of a mixed color and a reference value of each of the tones, the mixed color made of at least two colors among the plurality of colors; and a control unit which updates the multi-dimensional LUT, wherein, each of the image forming apparatuses forms an image of the mixed-color pattern on the sheet, compares color values representing color shades for each of the tones between an observed value of the image of the mixed-color pattern formed on the sheet and the reference value of the mixed-color pattern stored in the storage unit, and determines that the multi-dimensional LUT needs to be updated and updates the multi-dimensional LUT if the difference of the color values is determined to be large on the basis of a threshold value.

Preferably, each of the image forming apparatuses carries out primary-color calibration by using a single-color pattern including a gradation of tones, forms an image of the mixed-color pattern during the primary-color calibration and compares the observed value of the image with the reference value.

According to the fifth aspect of a preferred embodiment of the present invention, there is provided a method of updating a multi-dimensional LUT which is used by an image forming apparatus to convert a color space of image data to another color space of color materials used in image formation, the method including forming an image of a mixed-color pattern which includes a gradation of tones of a mixed color made of at least two colors on a sheet; determining whether a difference of the color values is large on the basis of a threshold value by comparing color values representing color shades for each of the tones between an observed value of the image of the mixed-color pattern on the sheet and a reference value of the mixed-color pattern; and updating the multi-dimensional LUT by determining that the multi-dimensional LUT needs to be updated if the difference is determined to be large.

According to the sixth aspect of a preferred embodiment of the present invention, there is provided a method of updating a multi-dimensional LUT which is used by an image forming apparatus to convert a color space of image data to another color space of color materials used in image formation, the method including forming an image of a mixed-color pattern which includes a gradation of tones of a mixed color made of at least two colors on a sheet; determining whether a difference of the color values is large on the basis of a threshold value by comparing color values representing color shades for each of the tones between an observed value of the image of the mixed-color pattern on the sheet and a reference value of the mixed-color pattern stored in the image forming apparatus; and updating the color value of the reference value of the mixed-color pattern stored in the image forming apparatus to the observed value for each of the tones and maintaining the current multi-dimensional LUT if the difference is determined to be large.

According to the seventh aspect of a preferred embodiment of the present invention, there is provided a method of updating a multi-dimensional LUT to convert a color space of image data to a color space of color materials used in image formation by a plurality of image forming apparatuses which are connected in series and include at least a first image forming apparatus serving as a reference and a second image forming apparatus not serving as a reference, the method including forming an image of a mixed-color pattern which includes a gradation of tones of a mixed color made of at least two colors on a sheet by each of the image forming apparatuses; determining whether the difference of the color values is large on the basis of a threshold value in the second image forming apparatus by comparing color values representing color shades for each of the tones between an observed value of the mixed-color pattern formed by the first image forming apparatus and an observed value of the mixed-color pattern formed by the second image forming apparatus; and updating the multi-dimensional LUT in the second image forming apparatus by determining that the multi-dimensional LUT of the second image forming apparatus needs to be updated if the difference is determined to be large.

According to the eighth aspect of a preferred embodiment of the present invention, there is provided a method of updating a multi-dimensional LUT to convert a color space of image data to another color space of color materials for image formation used by a plurality of image forming apparatuses connected via a network, the method including forming an image of a mixed-color pattern including a gradation of tones for a mixed color made of at least two colors on a sheet by each of the image forming apparatuses; determining whether the difference of the color values is large on the basis of a threshold value in each of the image forming apparatuses by comparing color values representing color shades for each of the tones between an observed value of the mixed-color pattern formed on the sheet and a reference value of the mixed-color pattern; and determining that the multi-dimensional LUT needs to be updated and updating the multi-dimensional LUT by each of the image forming apparatuses if the difference is determined to be large.

Thus, a large variation in color reproducibility that requires the update of a multi-dimensional LUT can be readily determined by using mixed-color patterns that can be readily calorimetrically measured, without preparation of a color chart containing an extremely large number of mixed colors and tones. A comparison of color values representing color shades of a mixed color between reference values and observed values in a mixed-color pattern leads to objective determination of a larger shift of the current color reproducibility from the targeted color reproducibility. Thus, necessity of updating the multi-dimensional LUT can be determined readily and appropriately.

The entire disclosure of Japanese Patent Application No. 2012-048738 filed on Mar. 6, 2012 including description, claims, drawings, and abstract are incorporated herein by reference in its entirety.

What is claimed is:

1. An image forming apparatus comprising:
an image forming unit which forms an image on a sheet by using color materials of a plurality of colors on basis of image data;
a color conversion unit which converts a color space of the image data to a color space of the color materials used by the image forming unit by using a multi-dimensional look up table (LUT);
a storage unit which stores a mixed-color pattern including a gradation of tones of a mixed color and a reference value of each of the tones, the mixed color made of at least two colors among the plurality of colors; and
a control unit which forms the image of the mixed-color pattern on the sheet with the image forming unit, compares color values representing color shades for each of the tones between an observed value of the image of the mixed-color pattern formed on the sheet and the reference value of the mixed-color pattern stored in the storage unit, and determines that the multi-dimensional look up table (LUT) needs to be updated and updates the multi-dimensional look up table (LUT) if a difference of the color values is determined to be large on the basis of a threshold value.

2. The image forming apparatus according to claim 1, wherein the control unit carries out primary-color calibration by using a single-color pattern including a gradation of tones, forms the image of the mixed-color pattern with the image forming unit during the primary-color calibration and compares the observed value with the reference value.

3. The image forming apparatus according to claim 1, wherein the control unit carries out multi-color calibration by using the mixed-color pattern and compares the observed value of the image of the mixed-color pattern which is formed during the multi-color calibration with the reference value.

4. The image forming apparatus according to claim 1, wherein,
the colors of the color materials include cyan (C), magenta (M), yellow (Y), and black (K),
the mixed-color pattern includes the gradation of tones for each of the mixed colors R, G, B, and 3C,
the mixed color R is a 1:1 mixture of M and Y,
the mixed color G is a 1:1 mixture of C and Y,
the mixed color B is a 1:1 mixture of C and M, and
the mixed color 3C is a 1:1:1 mixture of C, M, and Y.

5. The image forming apparatus according to claim 1, wherein the control unit notifies necessity of updating the multi-dimensional look UP table (LUT) before updating the multi-dimensional look up table (LUT).

6. An image forming apparatus comprising:
an image forming unit which forms an image on a sheet by using color materials of a plurality of colors on basis of image data;
a color conversion unit which converts a color space of the image data to a color space of the color materials used by the image forming unit by using a multi-dimensional look up table (LUT);
a storage unit which stores a mixed-color pattern including a gradation of tones of a mixed color and a reference value of each of the tones, the mixed color made of at least two colors among the plurality of colors; and
a control unit which forms the image of the mixed-color pattern on the sheet with the image forming unit, compares color values representing color shades for each of the tones between an observed value of the image of the mixed-color pattern formed on the sheet and the reference value of the mixed-color pattern stored in the storage unit, and updates the reference value of the mixed-color pattern stored in the storage unit to the observed value for each of the tones and maintains the current multi-dimensional look up table (LUT) if the difference of the color values is determined to be large on the basis of a threshold value.

7. The image forming apparatus according to claim 6, wherein the control unit carries out primary-color calibration by using a single-color pattern including a gradation of tones, forms the image of the mixed-color pattern with the image forming unit during the primary-color calibration and compares the observed value with the reference value.

8. The image forming apparatus according to claim 6, wherein the control unit carries out multi-color calibration by using the mixed-color pattern and compares the observed value of the image of the mixed-color pattern which is formed during the multi-color calibration with the reference value.

9. The image forming apparatus according to claim 6, wherein,
the colors of the color materials include cyan (C), magenta (M), yellow (Y), and black (K),
the mixed-color pattern includes the gradation of tones for each of the mixed colors R, G, B, and 3C,
the mixed color R is a 1:1 mixture of M and Y,
the mixed color G is a 1:1 mixture of C and Y,
the mixed color B is a 1:1 mixture of C and M, and
the mixed color 3C is a 1:1:1 mixture of C, M, and Y.

10. An image forming system comprising:
a plurality of image forming apparatuses which are connected in series including a first image forming apparatus serving as a reference and a second image forming apparatus not serving as the reference, each of the image forming apparatuses comprising:
an image forming unit which forms an image on a sheet by using color materials of a plurality of colors on basis of image data;
a color conversion unit which converts a color space of the image data to a color space of the color materials used by the image forming unit by using a multi-dimensional look up table (LUT);
a storage unit which stores a mixed-color pattern including a gradation of tones of a mixed color and a reference value of each of the tones, the mixed color made of at least two colors among the plurality of colors; and
a control unit which updates the multi-dimensional look up table (LUT),
wherein,
each of the image forming apparatuses forms the image of the mixed-color pattern on the sheet, and
the second image forming apparatus compares color values representing color shades for each of the tones between an observed value of the mixed-color pattern provided by the first image forming apparatus, which is a reference value, and an observed value of the mixed-color pattern provided by the second image forming apparatus, and determines that the multi-dimensional look up table (LUT) of the second image forming apparatus needs to be updated and updates the multi-dimensional look up table (LUT) if the difference of the color values is determined to be large on the basis of a threshold value.

11. The image forming system according to claim 10, wherein each of the image forming apparatuses carries out primary-color calibration by using a single-color pattern including a gradation of tones, forms the image of the mixed-color pattern during the primary-color calibration and compares the observed value with the reference value.

12. The image forming system according to claim 10, wherein each of the image forming apparatuses carries out multi-color calibration by using the mixed-color pattern and compares the observed value of the image of the mixed-color pattern formed during the multi-color calibration with the reference value.

13. The image forming system according to claim 10, wherein,
the colors of the color materials include cyan (C), magenta (M), yellow (Y), and black (K),
the mixed-color pattern includes the gradation of tones for each of the mixed colors R, G, B, and 3C,
the mixed color R is a 1:1 mixture of M and Y,
the mixed color G is a 1:1 mixture of C and Y,
the mixed color B is a 1:1 mixture of C and M, and
the mixed color 3C is a 1:1:1 mixture of C, M, and Y.

14. The image forming system according to claim 10, wherein each of the image forming apparatuses notifies necessity of updating the multi-dimensional look up table (LUT) before updating the multi-dimensional look up table (LUT).

15. An image forming system comprising a plurality of image forming apparatuses connected via a network, each of the image forming apparatuses comprising:
an image forming unit which forms an image on a sheet by using color materials of a plurality of colors on basis of image data;
a color conversion unit which converts a color space of the image data to a color space of the color materials used by the image forming unit by using a multi-dimensional look up table (LUT);
a storage unit which stores a mixed-color pattern including a gradation of tones of a mixed color and a reference value of each of the tones, the mixed color made of at least two colors among the plurality of colors; and
a control unit which updates the multi-dimensional look UP table (LUT),
wherein,
each of the image forming apparatuses forms the image of the mixed-color pattern on the sheet, compares color values representing color shades for each of the tones between an observed value of the image of the mixed-color pattern formed on the sheet and the reference value of the mixed-color pattern stored in the storage unit, and determines that the multi-dimensional look up table (LUT), needs to be updated and updates the multi-dimensional look up table (LUT), if the difference of the color values is determined to be large on the basis of a threshold value.

16. The image forming system according to claim 15, wherein each of the image forming apparatuses carries out primary-color calibration by using a single-color pattern including a gradation of tones, forms an image of the mixed-color pattern during the primary-color calibration and compares the observed value of the image with the reference value.

17. A method of updating a multi-dimensional look up table (LUT) which is used by an image forming apparatus to convert a color space of image data to another color space of color materials used in image formation, the method comprising:
forming an image of a mixed-color pattern which includes a gradation of tones of a mixed color made of at least two colors on a sheet;
determining whether a difference of color values is large on basis of a threshold value by comparing the color values representing color shades for each of the tones between an observed value of the image of the mixed-color pattern on the sheet and a reference value of the mixed-color pattern; and
updating the multi-dimensional look up table (LUT) by determining that the multi-dimensional look up table (LUT) needs to be updated if the difference is determined to be large.

18. A method of updating a multi-dimensional look up table (LUT) which is used by an image forming apparatus to convert a color space of image data to another color space of color materials used in image formation, the method comprising:

forming an image of a mixed-color pattern which includes a gradation of tones of a mixed color made of at least two colors on a sheet;

determining whether a difference of color values is large on basis of a threshold value by comparing the color values representing color shades for each of the tones between an observed value of the image of the mixed-color pattern on the sheet and a reference value of the mixed-color pattern stored in the image forming apparatus; and updating the color value of the reference value of the mixed-color pattern stored in the image forming apparatus to the observed value for each of the tones and maintaining the current multi-dimensional look up table (LUT) if the difference is determined to be large.

19. A method of updating a multi-dimensional look up table (LUT) to convert a color space of image data to a color space of color materials used in image formation by a plurality of image forming apparatuses which are connected in series and include at least a first image forming apparatus serving as a reference and a second image forming apparatus not serving as the reference, the method comprising:

forming an image of a mixed-color pattern which includes a gradation of tones of a mixed color made of at least two colors on a sheet by each of the image forming apparatuses;

determining whether difference of color values is large on basis of a threshold value in the second image forming apparatus by comparing the color values representing color shades for each of the tones between an observed value of the mixed-color pattern formed by the first image forming apparatus and an observed value of the mixed-color pattern formed by the second image forming apparatus; and updating the multi-dimensional look up table (LUT) in the second image forming apparatus by determining that the multi-dimensional look up table (LUT) of the second image forming apparatus needs to be updated if the difference is determined to be large.

20. A method of updating a multi-dimensional look up table (LUT) to convert a color space of image data to another color space of color materials for image formation used by a plurality of image forming apparatuses connected via a network, the method comprising:

forming an image of a mixed-color pattern including a gradation of tones for a mixed color made of at least two colors on a sheet by each of the image forming apparatuses;

determining whether difference of color values is large on basis of a threshold value in each of the image forming apparatuses by comparing the color values representing color shades for each of the tones between an observed value of the mixed-color pattern formed on the sheet and a reference value of the mixed-color pattern; and updating the multi-dimensional look up table (LUT) in each of the image forming apparatuses by determining that the multi-dimensional look up table (LUT) needs to be updated if the difference is determined to be large.

* * * * *